US012797654B2

(12) United States Patent
Chase et al.

(10) Patent No.: US 12,797,654 B2
(45) Date of Patent: Nov. 17, 2026

(54) FIRE STOP ASSEMBLY FOR CONCRETE STRUCTURES

(71) Applicant: RELIANCE WORLDWIDE CORPORATION, Atlanta, GA (US)

(72) Inventors: Jacob Chase, Murfreesboro, TN (US); Virgil O'Neil, San Diego, CA (US); James Cosley, Ramona, CA (US)

(73) Assignee: Reliance Worldwide Corporation, Atlanta, GA (US)

( * ) Notice: Subject to any disclaimer, the term of this patent is extended or adjusted under 35 U.S.C. 154(b) by 233 days.

(21) Appl. No.: 18/812,522

(22) Filed: Aug. 22, 2024

(65) Prior Publication Data

US 2025/0001224 A1 Jan. 2, 2025

Related U.S. Application Data

(63) Continuation of application No. 17/907,104, filed as application No. PCT/US2021/024150 on Mar. 25, 2021, now Pat. No. 12,090,352.

(60) Provisional application No. 63/000,024, filed on Mar. 26, 2020.

(51) Int. Cl.
*A62C 2/06* (2006.01)
*F16L 5/04* (2006.01)

(52) U.S. Cl.
CPC ................ *A62C 2/065* (2013.01); *F16L 5/04* (2013.01)

(58) Field of Classification Search
CPC ... A62C 2/065; A62C 3/16; A62C 2/06; F16L 5/04; F16L 5/10; F16L 5/02; F16L 1/06; F16L 3/1091; F16L 27/11; H02G 3/0412
USPC ........................................................... 169/45
See application file for complete search history.

(56) References Cited

U.S. PATENT DOCUMENTS 4,951,442 A * 8/1990 Harbeke, Jr. .......... A62C 2/065 29/447
5,103,609 A 4/1992 Thoreson et al.
6,725,615 B1 4/2004 Porter et al.
7,082,730 B2 8/2006 Monden et al.
7,596,914 B2 * 10/2009 Stahl, Sr. .................. F16L 5/04 52/220.8
9,162,093 B2 10/2015 Foerg et al.
2004/0149390 A1 * 8/2004 Monden .................... F16L 5/04 156/391

(Continued)

OTHER PUBLICATIONS

International Preliminary Report on Patentability; International Patent Application No. PCT/US2021/024150; Sep. 22, 2022.

(Continued)

*Primary Examiner* — Chee-Chong Lee
*Assistant Examiner* — Juan C Barrera
(74) *Attorney, Agent, or Firm* — Barnes & Thornburg LLP

(57) ABSTRACT

A concrete structure with a corrugated bottom surface has a pipe passing through a passage in the structure. A fire stop assembly has a first portion with a split plate, split cage, split intumescent ring, split inner smoke ring and split outer smoke ring each fastened together to rotate together about a hinge on the split cage. The fire stop assembly has a second portion of the split plate, split cage, split intumescent ring, split inner smoke ring and split outer smoke ring fastened together to rotate together about a hinge. The first and second portions have free ends that spread apart to fit around the tube in an open position, and close around the tube in a closed position.

20 Claims, 9 Drawing Sheets

(56) References Cited

U.S. PATENT DOCUMENTS

| | | | |
|---|---|---|---|
| 2008/0053697 A1 | 3/2008 | Bowman | |
| 2013/0161030 A1 | 6/2013 | Munzenberger et al. | |
| 2015/0121782 A1 * | 5/2015 | McConnell .............. | H02G 3/22 52/232 |
| 2015/0121783 A1 | 5/2015 | Mcconnell et al. | |
| 2019/0257082 A1 | 8/2019 | Brown et al. | |

OTHER PUBLICATIONS

International Search Report and Written Opinion; International Patent Application No. PCT/US2021/024150; Jun. 4, 2021.

* cited by examiner

FIRE STOP ASSEMBLY FOR CONCRETE STRUCTURES

CROSS-REFERENCE TO RELATED APPLICATIONS

This patent application is a continuation of U.S. patent application Ser. No. 17/907,104, filed Sep. 23, 2022, now issued U.S. Pat. No. 12,090,352 which is a U.S. National Phase of International Patent Application No. PCT/US2021/024150, filed on Mar. 25, 2021, which claims priority to U.S. Provisional Patent Application No. 63/000,024 filed on Mar. 26, 2020.

INCORPORATION BY REFERENCE

The contents of U.S. patent application Ser. No. 17/907,104, filed Sep. 23, 2022, now issued U.S. Pat. No. 12,090,352; International Patent Application No. PCT/US2021/024150, filed on Mar. 25, 2021; and U.S. Provisional Patent Application No. 63/000,024, filed on Mar. 26, 2020, are incorporated herein by reference as if set forth in their entirety.

BACKGROUND

Building regulations may require a fire activated seal in passages through concrete structures, such as decks, slabs, walls, and floors. Cast-in-place assemblies are known that embed a tube and sealing materials in the concrete as it is poured and hardens. But concrete floors in buildings are sometimes poured on top of corrugated metal forms and affixing the cast-in-place assemblies to corrugated forms presents sealing problems because of the ridges and channels of the corrugated bottom plate. Moreover, forming the holes before the concrete is poured requires cutting a hole in the corrugated metal form to fit the cast-in-place assembly. Because such holes in the metal corrugated plate weaken the plate that is required to support the weight of the wet concrete, it is very disfavored.

The holes through concrete are thus typically drilled or bored after the concrete hardens, and because the holes are formed by rotating tools the holes are typically cylindrical. Thus, after pouring and hardening the concrete slab, holes are typically cut through the floors and corrugation to form tubular passages to accommodate various plumbing fixtures and tubes, including bathtub and shower drains, floor drains, plumbing pipes, and other elongated members that pass through the generally cylindrical hole. Installing fire-blocking materials in these holes through hardened concrete is problematic. The plumbing fixtures and other assemblies for the various elongated members that pass through the tubular passage usually block access to the top end of the passage through the concrete. There is thus a need for a way to provide a fire-blocking material in tubular passages through concrete structures.

The bottom end of the tubular passage passes through the corrugation—which creates a three-dimensional bottom opening to the tubular passage. Because the location of the passage relative to the ridges and channels formed by a corrugated bottom plate can vary, the variable location makes it difficult to use a standard assembly for each tubular passage on the bottom side of the concrete. There is thus a need for an apparatus to provide a fire-blocking material in tubular passages through concrete floors formed on corrugated bottom plates. The present disclosure addresses these and other related and unrelated issues in the art.

SUMMARY

According to an embodiment, there is provided a fire stop assembly for a cylindrical passage extending through a hardened concrete structure having a corrugated bottom plate along a first side of the concrete structure and a hardened concrete surface on an opposing second side of the concrete structure. The fire stop assembly has an assembly longitudinal axis. The fire stop assembly includes a support plate having first and second support plate portions that rotate about a rotational axis parallel to the assembly longitudinal axis between open and closed positions. The respective first and second support plate portions each have respective first and second free plate ends which free plate ends are adjacent each other in the closed position and apart from each other in the open position. The first and second support plate portions when in the closed position cooperating to define a circular support plate opening centered about the assembly longitudinal axis. The fire stop assembly further including a cylindrical cage having first and second sidewall portions with each sidewall portion connected to the respective first and second support plate portions and rotating between the open and closed positions with the respective first and second support plate portions. The first and second sidewall portions each have respective first and second sidewall free ends which sidewall free ends are adjacent each other in the closed position and spaced apart from each other in the open position. The first and second sidewall portions cooperate when in the closed position to encircle the assembly longitudinal axis. The first and second sidewall portions each have corresponding first and second distal ends opposite the first and second support plate portions and extending along the assembly longitudinal axis. The fire stop assembly further including a split intumescent ring having first and second intumescent ring portions each connected to and located radially inward of the respective first and second sidewall portions and rotating between the open and closed positions with the respective sidewall portions. The first and second intumescent ring portions each having respective first and second intumescent ring free ends are adjacent each other in the closed position and spaced apart from each other in the open position. The first and second intumescent ring portions cooperate when in the closed position to encircle the assembly longitudinal axis. The first and second intumescent ring portions each have corresponding first and second intumescent distal ends that extend a first distance beyond the first and second sidewall distal ends along the assembly longitudinal axis.

According to various embodiments, the first and second intumescent ring portions each may have a length L measured along the assembly longitudinal axis and the first distance is between 0.2L and 2L. The corrugated bottom plate has a corrugation height H measured along the assembly longitudinal axis and extending toward the second side of the concrete structure, the concrete structure having a thickness of T measured between a corrugation ridge and the second side of the slab. The first and second sidewall portions each may have a height along the assembly longitudinal axis which height is H or greater and which height is also less than the combined distance of the thickness T and the height H. The first distance may be H or greater and which first distance may also be less than the combined distance of the thickness T and the height H. The corrugated bottom plate has alternating ridges and channels, and the support plate defining a support plate plane orthogonal to the assembly longitudinal axis. The first and second support plate portions each may have a length sufficient to extend from one ridge to an adjacent ridge. The first and second support plate portions each may have a length sufficient to extend across two to four ridges located in the plane of the support plate. The first and second sidewall portions each may having cage arms extending radially inward toward the assembly longitudinal axis in the closed position, the first and second intumescent ring portions are engaged with the support arms. The fire stop assembly may further include respective first and second inner smoke ring portions fastened to and within the respective first and second intumescent ring portions and extending inward toward the assembly longitudinal axis. The first and second inner smoke ring portions may have respective first and second inner smoke ring free ends which are spaced apart from each other in the open position and adjacent to or contacting each other in the closed position. The fire stop assembly may further include first and second outer smoke ring portions fastened to and about the respective first and second sidewall portions and having respective first and second outer smoke ring free ends which are spaced apart from each other in the open position and adjacent to or contacting each other in the closed position. The passage is sized to allow a tube to pass through the passage. The first and second sidewall free ends may be separated from each other a distance sufficient to allow the tube to pass between the first and second sidewall free ends in the open position.

According to another embodiment, there provided a fire stop assembly for a cylindrical passage extending through a hardened concrete structure having a corrugated bottom plate forming a first side of the concrete structure and a hardened concrete surface on an opposing second side of the concrete structure. The corrugated bottom plate having alternating ridges and channel. The fire stop assembly has an assembly longitudinal axis, the corrugated bottom plate has a corrugation height H measured along the assembly longitudinal axis and extending toward the second side of the slab, and the concrete structure has a slab thickness of T measured between a corrugation ridge and the second side of the concrete structure. The fire stop assembly includes a support plate having first and second support plate portions that rotate about a rotational axis parallel to the assembly longitudinal axis between open and closed positions. The respective first and second support plate portions each have a respective first and second free plate ends which free plate ends are adjacent each other in the closed position and apart from each other in the open position. The first and second support plate portions when in the closed position cooperate to define a circular support plate opening centered about the assembly longitudinal axis. The support plate define a support plate plane orthogonal to the assembly longitudinal axis, and the first and second support plate portions each have a length sufficient to extend from one ridge to an adjacent ridge. The fire stop assembly further includes a cylindrical cage having first and second sidewall portions with each sidewall portion connected to the respective first and second support plate portions and rotating between the open and closed positions with the respective first and second support plate portions, the first and second sidewall portions each having respective first and second sidewall free ends which sidewall free ends are adjacent each other in the closed position and spaced apart from each other in the open position, the first and second sidewall portions cooperating when in the closed position to encircle the assembly longitudinal axis, the first and second sidewall portions each have corresponding first and second distal ends opposite the first and second support plate portions and extending along the assembly longitudinal axis, the first and second sidewall portions each have a height along the assembly longitudinal axis which height is the height H or greater and which height is also less than the combined distance of the thickness T and the height H. The fire stop assembly further includes a split intumescent ring having first and second intumescent ring portions each connected to and located radially inward of the respective first and second sidewall portions and rotating between the open and closed positions with the respective sidewall portions. The first and second intumescent ring portions each have respective first and second intumescent ring free ends are adjacent each other in the closed position and spaced apart from each other in the open position, the first and second intumescent ring portions cooperating when in the closed position to encircle the assembly longitudinal axis.

According to various embodiments, the first and second intumescent ring portions each may have corresponding first and second intumescent distal ends that extend a first distance beyond the first and second sidewall distal ends along the assembly longitudinal axis. The first and second intumescent ring portions each may have a length L measured along the assembly longitudinal axis and the first distance is between 0.2L and 2L. The first distance may be H or greater and which distance may also be less than the combined distance of the thickness T and the height H. The first and second support plate portions each may have a length sufficient to extend across two to four ridges located in the plane of the support plate. The first and second sidewall portions each have cage arms may extend radially inward toward the assembly longitudinal axis in the closed position, the first and second intumescent ring portions are engaged with the support arms. The fire stop assembly may further include first and second inner smoke ring portions fastened to and within the respective first and second intumescent ring portions and extending inward toward the assembly longitudinal axis, the first and second inner smoke ring portions having respective first and second inner smoke ring free ends which are spaced apart from each other in the open position and adjacent to or contacting each other in the closed position. The fire stop assembly may further include first and second outer smoke ring portions fastened to and about the respective first and second sidewall portions and having respective first and second outer smoke ring free ends which are spaced apart from each other in the open position and adjacent to or contacting each other in the closed position. The passage is sized to allow a tube to pass through the passage. The first and second sidewall free ends may be separated from each other a distance sufficient to allow the tube to pass between the first and second sidewall free ends in the open position. The first and second intumescent ring free ends may be separated from each other a distance sufficient to allow the tube to pass between the first and second intumescent ring free ends in the open position.

According to another embodiment, there is provided a method of installing a fire stop assembly about a tube in a cylindrical passage extending through a hardened concrete structure having a corrugated bottom plate along a first side of the concrete structure and a hardened concrete surface on an opposing second side of the structure. The fire stop assembly has an assembly longitudinal axis. The method includes the step of providing a fire stop assembly. The fire stop assembly may be as described above. The method further includes the step of positioning the fire stop assembly around the tube by translating the fire stop assembly orthogonal to the assembly longitudinal axis with the first and second support plate portions in the open position. The method further includes the step of closing the fire stop assembly around the tube by rotating the first and second support plate portions into the closed position with the tube extending through the circular support plate opening. The method further includes the step of translating the fire stop assembly parallel the assembly longitudinal axis along the tube into the passage.

According to various embodiments, the step of closing of the fire stop assembly may include rotating the first and second sidewall portions into the closed position to encircle the tube, and rotating the first and second intumescent ring portions into the closed position to encircle the tube. The step of translating the fire stop assembly may include positioning the support plate against the first side of the concrete structure. The corrugated bottom plate has a corrugation height H measured along the assembly longitudinal axis and extending toward the second side of the concrete structure. The step of translating the fire stop assembly may include extending the first and second intumescent distal ends at least a distance equal to H or greater into the concrete structure.

The above variations may be provided on or combined with any of the fire stop assemblies described herein.

BRIEF DESCRIPTION OF THE DRAWINGS

These and other advantages and features of the disclosure will be further appreciated in view of the following drawings and descriptions in which like numbers refer to like parts throughout, and in which.

DETAILED DESCRIPTION

Figure 1:
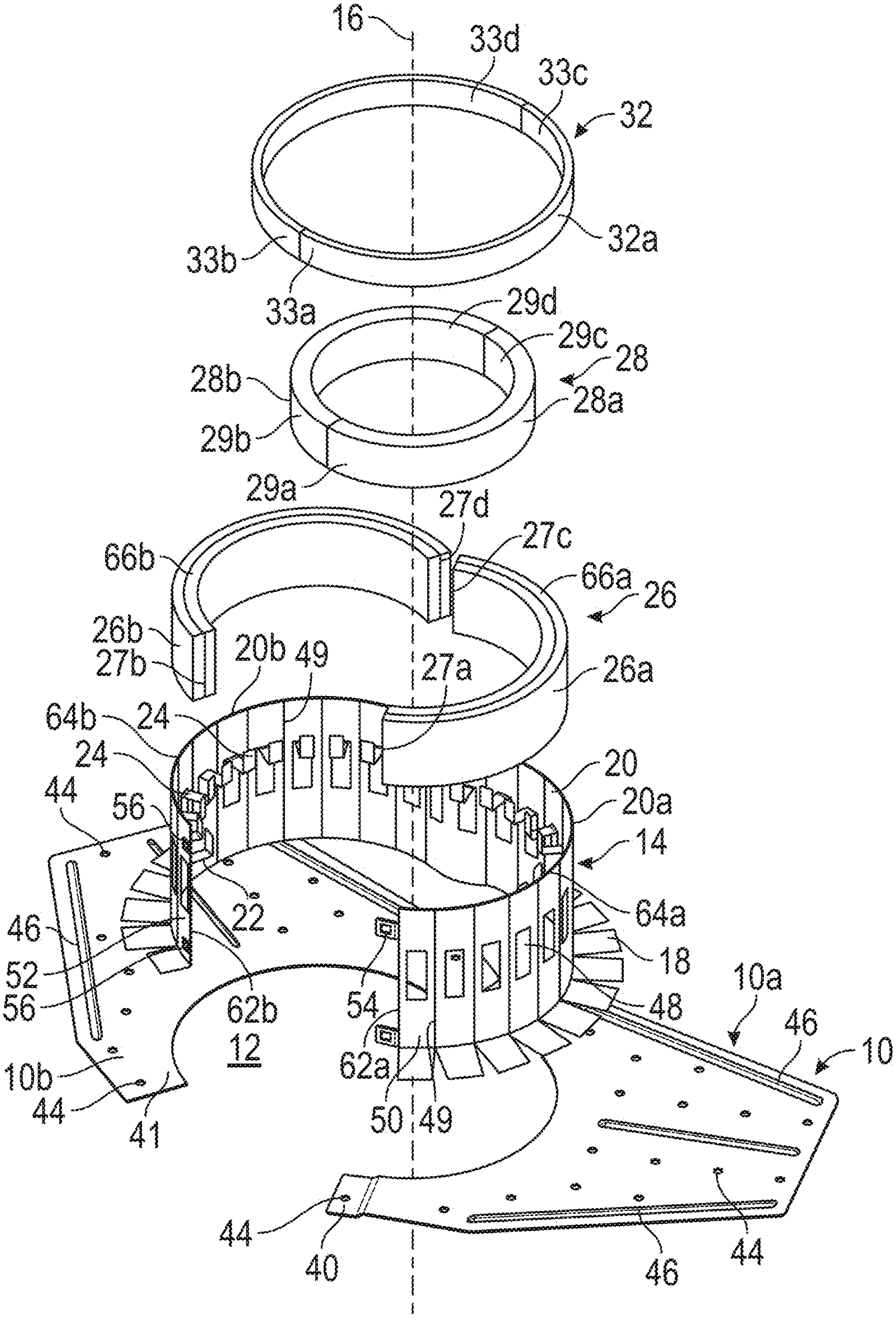
FIG. 1 is an exploded perspective view of a fire stop assembly for a concrete structure with most of the parts in an open position.

As used herein, the following part numbers refer to the following parts, throughout: 10—support plate; 10*a*, 10*b* first and second support plate portions; 12—opening in support plate; 14—cage; 16—assembly longitudinal axis; 18—cage feet; 18*a*, 18*b*, 18*c* specific cage feet; 20—sidewall; 20*a*, 20*b*—first and second sidewall portions; 22—cage arms; 24—distal ends of cage arms; 26—intumescent ring; 26*a*—first intumescent ring portion; 26*b*—second intumescent ring portion; 27*a* and 27*c*—opposing ends of portion 26*a*; 27*b* and 27*d*—opposing ends of portion 26*b*; 28—inner smoke ring; 28*a*—first portion of inner smoke ring 28; 28*b*—second portion of inner smoke ring 28; 29*a* and 29*c*—opposing ends of portion 28*a*; 29*b* and 29*d*—opposing ends of portion 28*b*; 30—tube; 32—outer smoke ring; 32*a*—first portion of outer smoke ring 32; 32*b*—second portion of outer smoke ring 32; 33*a* and 33*c*—opposing ends of portion 32*a*; 33*b* and 33*d*—opposing ends of portion 32*b*; 34—passage through a concrete structure; 36—concrete structure; 36*a* and 36*b* opposing surfaces of the concrete structure; 38—corrugated bottom plate; 40—first offset plate; 41—first plate second end; 42—second offset plate; 43—second plate second end; 44—fastener openings; 45*a, b*—ends of triangular offset; 46—rib; 47*a*—free edge of end 43; 48—rectangular opening; 49—fold line; 49*a*—hinge line; 50—first end segment; 52—second end segment; 54—first latch segment; 56—second latch segment; 58*a* and 58*b*—inclined edges; 60—support plate longitudinal axis; 62*a*, 62*b*—first and second sidewall free ends; 64*a*, 64*b*—first and second sidewall distal ends; 66*a*, 66*b*—first and second intumescent ring distal ends; 70—ridge; 72—ridge top; 74—channel; 76*a* and 76*b*—channel sidewall; 78—channel bottom; L—axial length of intumescent ring; T1—concrete structure thickness at thick part of corrugated concrete structure; T2—thickness at thin part of corrugated concrete structure; and H—corrugation ridge height.

As used herein, the relative directions inner and outer, inside and outside, are with respect to a longitudinal axis of the fire stop assembly which coincides with a longitudinal axis of a passage through a concrete structure, with inward directions or positions being toward or closer to that axis and outward directions or positions being away from or further from that axis. The lateral direction is generally perpendicular to the assembly longitudinal axis. The relative directions above and below, up and down, top and bottom, are with respect to the assembly longitudinal axis, recognizing that the axis will likely be vertical for the floors in a building, and that the axis will likely be horizontal if the concrete forms a wall of a building. As used herein, references to lengths measured along an axis include measurements along axes parallel to the specified axis, references to extending along an axis include extending along axes parallel to the specified axis, and references to rotation about an axis include rotation about axes parallel to the specified axis.

Referring to the Figures, a support plate 10 has an opening 12 with a cage 14 connected to the support plate 10 so as to encircle the opening 12, with the cage extending along an assembly longitudinal axis 16 through the center of the opening 12 which assembly longitudinal axis 16 which corresponds to a longitudinal axis of a passage through the concrete structure as described later. The cage 14 has a plurality of feet 18 extending outward from a bottom of a sidewall 20 of the cage 14 and has a plurality of cage arms 22 extending inward toward the assembly longitudinal axis 16 with distal ends 24 of the cage arms 22 oriented upward along the assembly longitudinal axis 16 to hold an intumescent ring 26 adjacent the inside of the sidewall 20 of the cage 14. An inner smoke ring 28 is configured to encircle a tube 30 (FIGS. 4C and 4D) passing through the intumescent ring 26 and opening 12 so the inner smoke ring is interposed between the inside of the intumescent ring 26 and the tube 30. The inner smoke ring 28 may be referred to as a pipe smoke ring when the smoke ring encircles a pipe. An outer smoke ring 32 is configured to encircle the outside of the sidewall 20 of the cage 14 and be interposed between the cage 14 and the wall(s) forming the passage 34 (FIG. 4) that extends through a concrete structure 36 (FIGS. 4C and 4D) having an exterior surface 36*a* and a bottom surface 36*b*, with a corrugated bottom plate 38 forming a corrugated bottom surface 36*b* on the concrete structure 36. The cage smoke ring 32 may be referred to as an outer smoke ring because extends between the cage 14 and passage 34 when installed to provide an outer seal with the cage 14. The sidewall 20 includes first and second sidewall portions 20*a*, 20*b* that each include respective first and second sidewall distal ends 62*a*, 62*b* with respect to the assembly longitudinal axis 16. As seen in FIG. 4D, the outer smoke ring 32 may extend axially beyond the first and second sidewall distal ends 62*a*, 62*b* of the respect first and second sidewall portions 20*a*, 20*b* of the sidewall 20, and is advantageously fastened to the outside of the top portion of the sidewall 20 adjacent the first and second sidewall distal ends 62*a*, 62*b*. In some embodiments, adhesives or impaling fasteners or threaded fasteners or other suitable fastening members or mechanisms can be employed.

In embodiments, the concrete structure 36 may be a concrete floor or concrete deck having corrugated bottom plate 38 on a lower side or bottom side 36*a* thereof to act as a concrete form when the concrete is poured. The term "concrete structure" is used herein to generally refer to any various types of concrete structures, including, but not limited to, floors, decks, walls, slabs, inclined slabs, etc. In this regard, such terms are used interchangeably herein. The corrugated bottom plate 38 is sometimes referred to as a concrete pan or corrugated metal concrete form.

The support plate 10 may include first and second support plate portions 10*a*, 10*b* which may be halves of the support plate 10. Referring to FIG. 1, the rings 26, 28, 32 may be split rings to allow them to open and close in a clam-shell manner with the first and second support plate portions 10*a*, 10*b*. The support plate portions 10*a*, 10*b* are similar to the split rings 26, 28 and 32 but are parts of a flat plate rather than parts of cylindrical rings. Thus, intumescent ring 26 forms a split ring with at least one split forming first and second adjacent ends 27*a*, 27*b*. The intumescent ring 26 forms two halves, first and second intumescent ring portions 26*a*, 26*b*, with the first intumescent ring portion 26*a* having opposing free ends 27*a*, 27*c* and with the second intumescent ring portion 26*b* having opposing free ends 27*b*, 27*d* if separated. The ends 27*a*, 27*b* are also referred to as the first and second intumescent ring portion free ends 27*a*, 27*b*. These free ends 27*a*, 27*b* move toward and away from each other as discussed herein. The free ends 27*c*, 27*d* usually remain adjacent to each other even in the open position and may be omitted if the inner smoke ring is sufficiently flexible that it can rotate along the rotational axis between the open and closed positions and not physically separate into two separate parts. Each portion of the split rings 26, 28, 32 is curved and extends over a curve of more than 120° and may extend over a curve of about 180°, and still more may extend over a curve of about 180° to about 190° so there is an overlap on at least one end of each of the support plate portions 10*a*, 10*b*.

Similarly, inner smoke ring 28 forms a split ring with at least one split forming first and second adjacent ends 29*a*, 29*b*. The inner smoke ring 28 may form two halves, first and second portions 28*a*, 28*b*, with first portion 28*a* having opposing ends 29*a*, 29*c* and with second portion 28*b* having opposing ends 29*b*, 29*d*. These inner smoke ring free ends are also referred to as first and second inner smoke ring free ends 29*a*, 29*b*, and third and fourth smoke ring free ends 29*c* and 29*d*. The free ends 29*a*, 29*b* move toward and away from each other as discussed herein. The free ends 29*c*, 29*d* usually remain adjacent to each other and may be omitted if the inner smoke ring 28 is sufficiently flexible that it can rotate along the rotational axis between the open and closed positions and not physically separate into two separate parts.

Further, the outer smoke ring 32 forms a split ring with at least one split forming adjacent first and second ends 33*a*, 33*b*. The outer smoke ring 32 may form two halves, first and second portions 32*a*, 32*b*, with the first portion 32*a* having opposing ends 33*a*, 33*c* and with the second portion 32*b* having opposing ends 33*c*, 33*d*. These free ends 32*a*, 32*b* are also referred to as first and second outer smoke ring free ends 33*a*, 33*b*, or as third and fourth outer smoke ring free ends 33*c*, 33*d*. These free ends 33*a*, 33*b* move toward and away from each other as discussed herein. The free ends 33*c*, 33*d* usually remain adjacent to each other and may be omitted if the inner smoke ring is sufficiently flexible that it can rotate along the rotational axis between the open and closed positions and not physically separate into two separate parts.

As used in the context of the intumescent ring 26, the inner smoke ring 28 and the outer smoke ring 32, the term "adjacent" is used to encompass contacting parts or parts that are very close together as at the ends 27*c*, 27*d*, 29*c*, 29*d*, 33*c* and 33*d*, and is also intended to encompass any physical separation of the free ends 27*a*, 27*b*, 29*a*, 29*b*, 33*a* and 33*b* which occur when the two portions of the hinged fire stop assembly are in both the open position and the closed position. The separation of the first and second free ends of the intumescent ring 26, the inner smoke ring 28 and the outer smoke ring 28 is not more than about 20% to about 40% larger than the tube diameter in order to reduce separation of the free ends 27*c*, 27*d*, 29*c*, 29*d*, 33*c* and 33*d* in the open position.

The intumescent ring 26, the inner smoke ring 28 and the outer smoke ring 32 may also have only one slit forming first and second adjacent ends 27*a*, 27*b*, first and second ends 29*a*, 29*b* and first and second ends 33*a*, 33*b*, respectively, with ends 27*c*, 27*d*, 29*c*, 29*d*, 33*c* and 33*d* not being physically slit and separated and instead representing ends of portions of the intumescent ring 26, the inner smoke ring 28 and the outer smoke ring 32 on opposing sides of the hinge about which the fire stop assembly opens and closes. One advantage of having only a single slit and one pair of adjacent ends is that it allows the portion of the respective ring diametrically opposite the slit, to act as a living hinge without requiring a physical separation. In some many cases that can reduce the number of parts, result in simpler manufacturing and assembly, reduce costs, and result in a stronger and more stable ring. There thus can be only one slit in each ring 26, 28, 32, which slit can be located in the plane along axis 16 and through the location where the first and second end segments 50, 52 contact each other, as described later.

The cage 14 forms a hinge parallel to the assembly longitudinal axis 16 and is connected to the support plate 10 so the cage 14 and support plate have a first open position allowing a tube 30 parallel to the axis 16 to move laterally through an opening between mating but spatially separated parts of the support plate and cage. The cage 14 and the support plate 10 have a second, closed position where the mating parts are joined to encircle and enclose the elongated tube 30 when the longitudinal axis of the tube 30 is coincident with the assembly longitudinal axis 16. The support plate 10 and the cage 14 and its sidewall 20 can thus rotate open and closed about an axis parallel to the assembly longitudinal axis 16 in a clamshell manner so they can fit around a preinstalled tube 30.

Similarly, the intumescent ring 26 has a first open position with ends 27*a*, 27*b* separated, and a second, closed position with ends 27*a*, 27*b* adjacent each other and may be directly contacting each other. Likewise, the inner smoke ring 28 has a first open position with ends 29*a*, 29*b* separated, and a second, closed position with ends 29*a*, 29*b* adjacent each other and may be directly contacting each other. Also, the outer smoke ring 32 has a first open position with ends 33*a*, 33*b* separated, and a second, closed position with ends 33*a*, 33*b* adjacent each other and may be directly contacting each other.

The support plate 10 and the cage 14 may be formed of metal, such as corrosion resistant steel, galvanized metal or metal coated to resist corrosion. The cage 14 is fastened to the support plate 10 so the cage 14 forms a hinge which allows the support plate 10 to be formed of two separate parts that move relative to each other and rotate about an axis parallel to the assembly longitudinal axis 16 with the cage 14. This motion allows the one side of the support plate 10 and the cage 14 to separate enough so the tube 30, such as a pipe or conduit, can fit through the separated parts and allow the cage 14 and the support plate 10 to be retrofit to preinstalled pipes, conduits or tubes. This construction is explained in more detail later.

Referring to the figures, the support plate 10 includes an elongated, generally flat plate with a central circular opening 12. As used herein, the depicted support plate 10 is considered generally flat even though its plate parts have ribs and offset hinges, because the majority of the area of the support plate 10 and its first and second support plate portions 10*a*, 10*b* are a flat sheet of material, such as metal. While a rectangular plate with the circular opening 12 bounded by parallel sides and parallel ends is believed suitable, the depicted embodiment has opposing parallel sides that extend a distance that is the same as the diameter of the circular opening 12, with those opposing sides then inclined toward each other. The ends are parallel but have a length between about half and about ¾ the diameter of the circular opening 12.

The support plate 10 is split at its middle to form the first and second support plate portions 10*a*, 10*b* that have overlapping end portions on opposing sides of the circular opening 12. The support plate portions 10*a*, 10*b* each have a recess defining a portion of the opening 12. The opening 12 may be circular and slightly larger than the diameter of tube 30, so the recesses are semi-circular, each about half a circle or more. First and second offset plates 40, 42 are on opposing ends of the semi-circular recess on the first support plate portion 10*a*. The first plate second end 41 and the second plate second end 43 are on opposing ends of the semi-circular recess on the second support plate portion 10*b*.

The first and second offset plates 40, 42 are offset from the plane of the first support plate portion 10*a* to form the first and second offset plates 40, 42 located on opposing sides of the semicircular recess in the first support plate portion 10*a* forming half of the opening 12. The offset plates 40, 42 on the first support plate portion 10*a* are located on opposing sides of the opening 12 and configured to overlap with corresponding first and second plate second ends 41, 43, respectively, on the second support plate portion 10*b* so the first offset plate 40 and the first plate second end 41 nest together and the second offset plate 42 and the second plate second end 43 nest together to slide over one another as the support plate portions 10*a*, 10*b* rotate open and closed in a clamshell motion described later. In some embodiments, the amount of the offset of the first and second offset plates 40, 42 is about equal to the thickness of the second support plate portion 10*b*, so the first and second support plate portions 10*a*, 10*b* are in the same plane to avoid tilting of the assembly longitudinal axis 16 when the support plate 10 rests against the corrugated bottom plate 38 or the corrugated surface of the concrete structure 36.

Figure 5A:
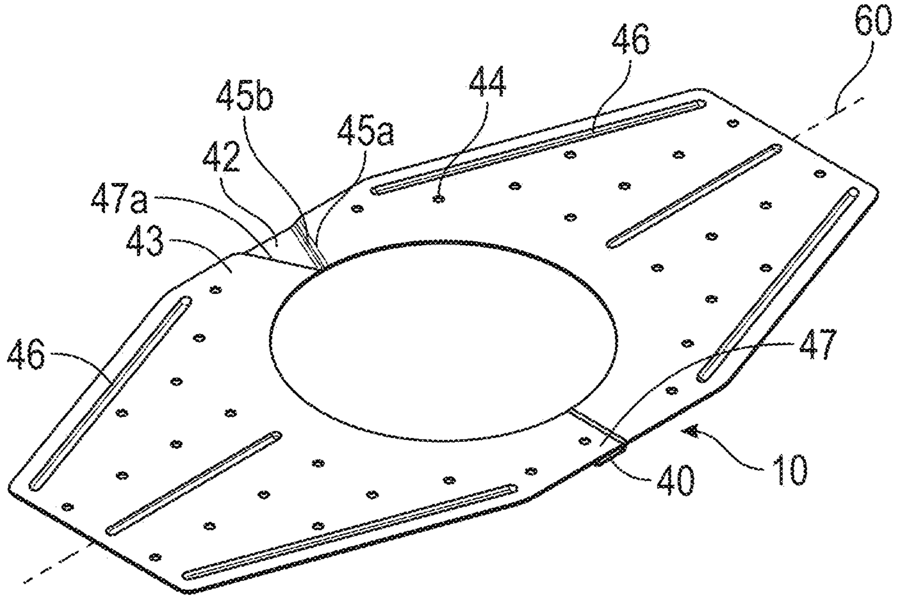
FIG. 5A is a top perspective view of a support plate shown in FIG. 2.
Figure 5B:
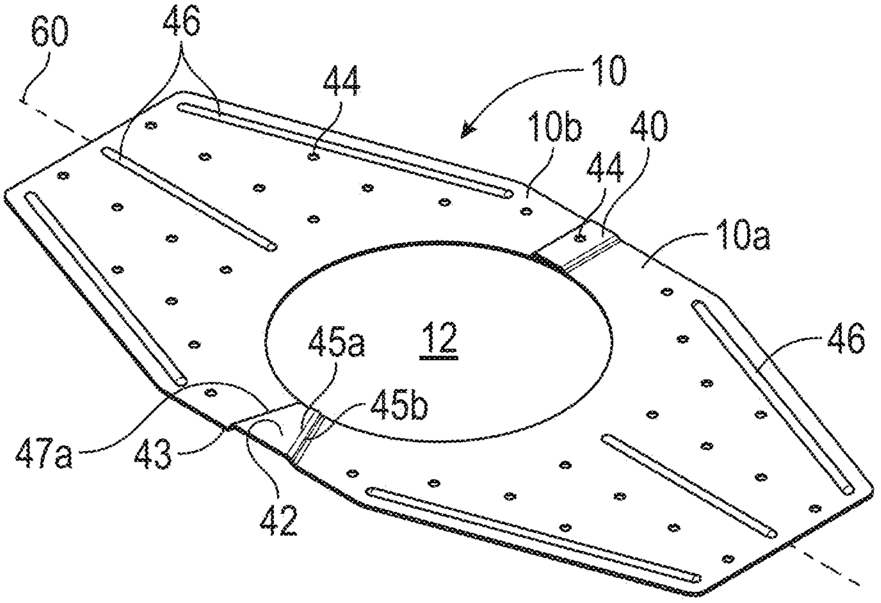
FIG. 5B is a bottom perspective view of the support plate of FIG. 5A.

The offset ends forming offset plates 40, 42 may each extend past the middle diameter of the circular opening 12, in a tangential direction or outward of that tangent to allow easy opening and closing of the first offset plate 40, the first plate second end 41, the second offset plate 42 and the second plate second end 43 without contacting a pipe or tube passing through the circular opening 12. In some embodiments, the second offset plate 42 is triangular shaped and wider at the outside edge and narrower at an inside edge which forms part of opening 12. Referring to FIG. 5B, the offset plate 42 has a free, distal edge 45*a* and an interior edge 45*b* that is bent to form the offset for the offset plate 42. The distal edge 45*a* and interior edge 45*b* are angled away from each other and away from a radial line through the assembly longitudinal axis 16, to form the triangular offset plate 42.

Figure 2A:
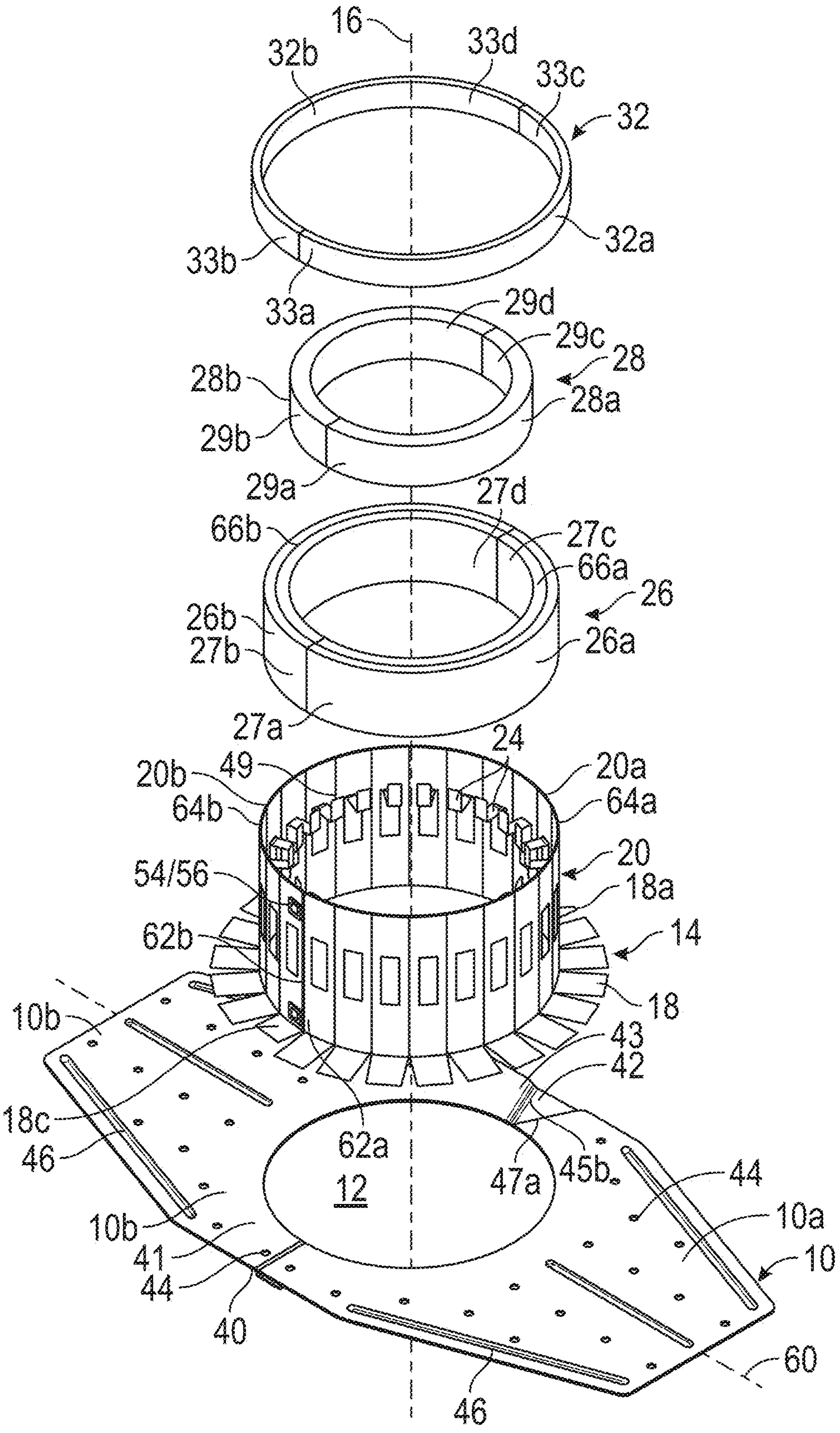
FIG. 2A is an exploded perspective view of the fire stop assembly of FIG. 1 with parts in a closed position.
Figure 2B:
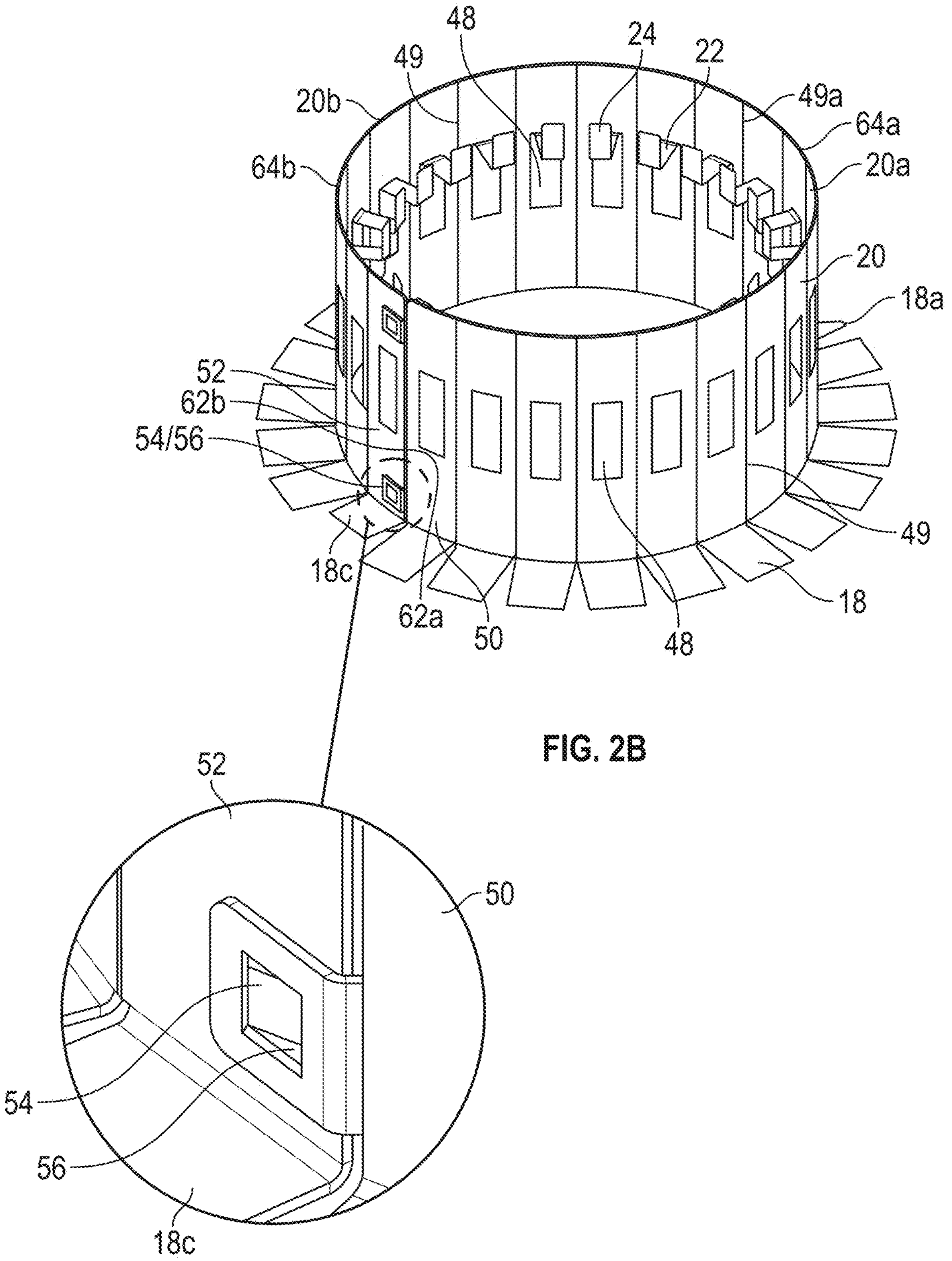
FIG. 2B is an exploded perspective view of a cage shown in FIG. 2B in a closed position, with an enlarged portion showing a latch connecting two end segments of the cage's sidewall in a closed position.

Referring to FIG. 2, the overlapping second plate second end 43 on second support plate portion 10*b* has a free distal edge 47*a* that also is angled relative to a radial line through assembly longitudinal axis 16, and angled to align with the interior bent edge 45*b* when the cage and support are in the open position. The support plate portions 10*a*, 10*b* rotate relative to each other at overlapping portions of the first and second support plates 10*a*, 10*b* and that triangular shape facilitates that relative rotation.

In addition, a plurality of fastener openings 44 are formed in each of the support plate portions 10*a*, 10*b* so the support plate 10 can be fastened to the corrugated bottom plate 38 or to the concrete structure 36 by fasteners such as concrete nails. A fastener opening 44 may be formed in the first offset plate 40 and another opening 44 can be formed in the underlying end 41 of the second half plate such that the fastener openings in those two parts align and a concrete nail can pass through the aligned openings and into the concrete 36 or the corrugated bottom plate 38 to fasten both of the support plate portions 10*a*, 10*b* together and also to fasten them to the concrete and/or corrugated bottom plate 38. The same may apply to fastener openings in the second offset plate 42 and the end portion of the second support plate portion 10*b*.

The support plate 10 optionally has stiffening or strengthening ribs 46 to strengthen the plate. The strengthening ribs 46 are formed by deforming the support plate 10 to form elongated, protruding ribs (FIG. 5B) on one side the side of the plate and corresponding elongated, grooves on the other side of the plate as seen in FIG. 5A. When installed, the side of the support plate 10 abutting corrugated bottom plate 38 may be the flattest side containing grooves so as to present a greater contact area with the corrugated bottom plate, and to present a better aligned plate because the side where the ribs 46 form protrusions can cause the plate to tilt when fastened against the corrugated surface. The ribs 46 extend along the outer edge of opposing sides of each of the first and second support plate portions 10*a*, 10*b*, with one or more ribs between those outer ribs. The side of the first and second support plate portions 10*a*, 10*b* facing the concrete surface may be flat and planar, so that surface contains the recess or groove portion of the ribs 46, while the opposing surface contains the protruding portion of the ribs 46. As seen in FIGS. 5A-5B, the offset plates 40, 42 are offset away from the side of the support plate portions 10*a*, 10*b* that face the concrete structure 36 to present a flatter surface to the corrugated bottom of the concrete structure 36.

The cage 14 may be formed of a sheet of metal which has a bottom side and a top side. The sheet is scored, stamped, or rolled between the top and bottom sides at periodic distances corresponding to the width of the cage feet 18 to form fold lines 49. The score lines may function as a living hinge allowing the adjacent segments of the cage 14 to bend along the length of the score line. The fold lines 49 may be on one or both sides of the sheet. If only one side of the sheet is scored, stamped or rolled, when the metal is bent it will form a corresponding fold line on the opposing side of the sheet. The metal between the fold lines 49 is cut, rolled, or stamped to form rectangular segments aligned with the assembly longitudinal axis 16 during use.

Further, toward the top end of the sheet, a smaller rectangle is cut or otherwise formed in each rectangular segment to form two parallel cuts and one horizontal cut between the parallel cuts with one end uncut. The cut portion is bent perpendicular to the sheet of metal to form the cage arms 22, and the arms are bent again so they are parallel to the metal sheet and form the distal ends 24 of the cage arms. When the arms 22 are bent inward a rectangular opening or window 48 is formed in the sidewall, with the cage arms 22 extending inward from a top side of each window 48. The windows 48 allow smoke to pass through them during a fire. Openings 48 may be shapes other than rectangular. Because that the shape of the cage arms 22 and the distal ends 24 define the shape of the opening 48 that is punched out or cut out of the sidewall 20, the shapes of the cage arms 22 and distal ends 24 change the shape of opening 48. From a manufacturing, installation and use perspective, the opening 48, the arms 22 and the distal ends 24 may be rectangular with parallel sides.

The metal between the score lines at the bottom of the sidewall is bent outward to form cage feet 18. When the rectangular sheet of rectangles formed by fold lines 49 is bent into a curved shape around axis 16 to form the curved sidewall 20, the cage feet 18 will splay apart, forming a triangular shaped gap between the facing edges of adjacent feet with the gap larger at the distal end of the feet and smaller near the sidewall 20. The sequence of the above steps to form the basic shape of the cage 14 can vary without departing from the scope of the present disclosure.

The length of the metal strip needed to form cage 14 can vary and can be selected to correspond with the diameter of the passage 34 through the concrete with the cage diameter slightly smaller than the passage diameter. As most passages 34 are cut to form cylindrical tubes, the metal strip is oriented so the fold lines 49 align with the assembly longitudinal axis 16 and the strip is then bent at the score lines to form a cylinder with the cage arms 22 extending toward the assembly longitudinal axis 16 and the distal ends 24 extending parallel to that axis. The cage feet 18 may be bent to extend radially outward from the axis 18 and parallel to the cage arms 20. Bending the cut or punched metal strip to form the cage arms 22 and the distal ends 24 leaves a rectangular hole 48 between each fold line 49, with the distal ends 24 of cage arms 22 extending upward when used with a concrete structure 36 in the case of a floor. The sidewall 20 between each pair of adjacent fold lines 49 forms a rectangular segment, with the plurality of segments forming a polygon that when assembled approximates a circular sidewall when the sidewall is bent around the assembly longitudinal axis 16 to form a circle for insertion into passage 34. The two opposing ends, first and second sidewall free ends 62*a*, 62*b*, of the sidewall 20 are respectively defined by first and second end segments 50, 52—which may move toward and away from each other.

The end 27*a* of the first intumescent ring portion 26*a* is advantageously flush with the distal end of first end segment 50, and the end 27*b* of second intumescent ring portion 26*b* is advantageously flush with the distal end of the second end segment 50, so that as end segments 50, 52 may approach and contact each other, the distal ends or circumferential ends 27*a*, 27*b* may approach and contact each other. This secures the first and second sidewall free ends 62*a*, 62*b* adjacent each other.

First and second mating latch portions 54, 56 are formed on different ones of the end segments 50, 52 and positioned on those end segments 50, 52 so the mating latch portions 54, 56 can engage each other to hold the end segments 50, 52 of the sidewall 20 together and form a circular cage 14 around the plate opening 12. The latch portions 54, 56 are advantageously male and female latch segments (e.g., male projection or tang engaging a mating hole or edge; hook and loop/catch). The depicted latch portions shown in FIG. 2B include a male latch portion 54 extending inward from a tab which extends in a circumferential direction from the free end of first end segment 50. The catch portion 56 may include a rectangular opening in the end segment 52 of the sidewall 20. The male projection 54 extends inward from the end segment 52 and is configured to engage the opening of catch 56 to connect the latch portions and hold the end segments 50, 52 together. Thus, a latching male tang 54 on end segment 50 extends inward a distance sufficient to pass through a mating opening 56 in adjacent end segment 52 to latch the parts together and restrain circumferential movement in one direction (counterclockwise in FIG. 2B) to restrain separation of the case sidewall and connected parts. The location of the latch and catch portions may be on opposing end segments 50, 52, or on different parts of the cage 14. The latch and catch portions can have other engaging configurations, including tabs extending radially from the end segments 50, 52 with threaded fasteners, other elongated fasteners, spot welding, adhesives, etc., holding the tabs together.

There are two sets of latching parts, first and second latch segments 50, 52, one set located at the first and second sidewall distal ends 20*a*, 20*b* of the sidewall 20 and another set at a bottom portion of the sidewall 20 adjacent the cage feet 18, to help maintain the segments of the sidewall 20 generally parallel to the assembly longitudinal axis 16 when installed in the concrete structure 36. If only one set of first and second latch segments 50, 52 are used then portions of the sidewall 20 could tilt relative to each other and make it more difficult to insert the first and second sidewall distal ends 20*a*, 20*b* of the sidewall 20 and the cage 14 (the end adjacent distal ends 24 of the cage arms), into the passage 34 during installation.

For assembly and installation, the cage 14, or portions of the cage 14, may be bent at each fold line 49 to form a cylindrical cage that is centered along the assembly longitudinal axis 16 and encircles the opening 12, with the splayed feet 18 extending laterally outward. The cage feet 18 are then fastened to the surface of the support plate portions 10*a*, 10*b* which faces the concrete structure 36 when installed. Spot welding can be used to permanently connect the parts together and the splayed cage feet 18 provide a large surface for spot welding or otherwise connecting the parts together, such as by adhesives, mechanical fasteners, friction welding and other connection or attachment mechanisms which may be permanent. Passing the cage feet 18 through one or more slots on the support plate 10, with or without bending the cage fee to resist separation, may also be used to releasably connect the cage 14 to the support plate 10.

The cage 14 forms a hinge when the support plate portions 10*a*, 10*b* are connected to different portions of the cage 14. The fold lines 49 create weakened lines that form a living hinge that flexes along the score lines without fatigue fracturing—at least for as many bending fluctuations as the cage 14 is likely to experience during its life. The fold lines 49 segmenting the sidewall 20 provide a plurality of potential flexible hinge locations, but the cage feet 18 can be connected to the support plates to limit, reduce, or inhibit that potential flexing. The cage 14 can flex about one fold line 49*a* (FIG. 6B) and that score line is aligned in a plane passing along the longitudinal axis 16, the center of opening 12 and the juncture of the free (latched) ends, the first and second sidewall free ends 62*a*, 62*b*, of the sidewall 20 of the cage 14, ideally the free edges of end segments 50, 52.

The hinge line 49*a* and assembly longitudinal axis 16 and juncture of opposing sidewall segments 50, 52 thus may be in the same plane. In one example, the juncture of the first and second support plate portions 10*a*, 10*b* is on that same plane, which plane bisects the triangular shape of the second offset plate 42.

The use of a living hinge reduces the outer diameter of the cage 14, which can allow the cage 14 to fit or otherwise be received within the passage 34. An axial rotating hinge could be used but that hinge would either extend inward or outward from the sidewall. If the hinge extends outward it may require a smaller diameter cage in order to fit inside the passage 34, it may create a larger annular space between the sidewall 20 and the passage 34 which is wasteful and must still be sealed during a fire, and it may push the assembly longitudinal axis 16 sideways to a location that is offset from the longitudinal axis of the passage 34 which makes it difficult to pass tubes 30 through the fire stop assembly. If the hinge extends inward from the sidewall, it interrupts the thickness and continuity of the intumescent ring and may cause uneven expansion during a fire, and degrade the sealing performance of the intumescent ring 26—especially if a gap in the sidewall 20 is formed above or below the hinge through which intumescent material may expand during a fair. The living hinge allows a uniform sidewall 20 and a more uniform and smaller space between the sidewall 20 and the passage 34.

Figure 6A:
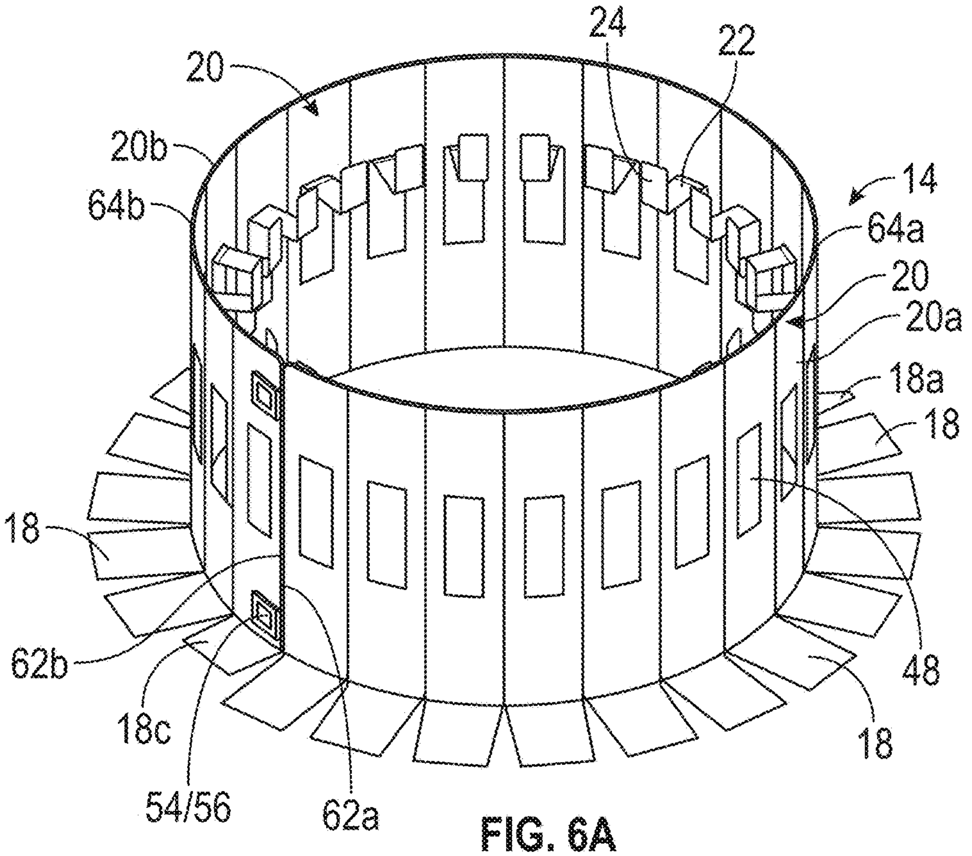
FIG. 6 A is a top perspective view of a cage shown in FIG. 2.
FIG. 6B is a bottom perspective view of the cage of FIG. 6A.
Figure 6B:
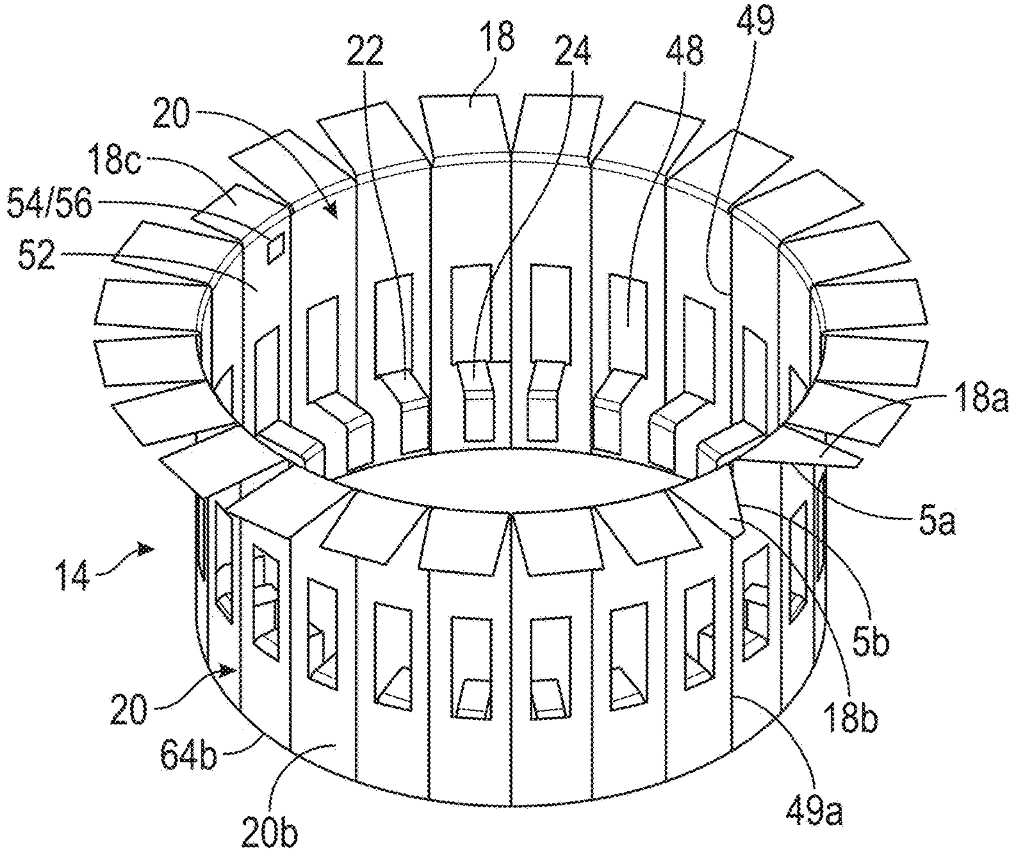

In some embodiments, half of the cage 14 is connected to first support plate portion 10*a* and the other half of the cage 14 is connected to the second support plate portion 10*b*, with both halves having a shared fold line 49 so the support plate portions 10*a*, 10*b* and the cage 14 hinge along and rotate along one vertical fold line 49*a* (FIG. 6B). This hinging of the first and second support plate portions 10*a*, 10*b* about the sidewall 20, allows the free end segments 50, 52 of the sidewall 20 to move away from each other to open and to move toward each other to close. As described elsewhere, this opening and closing also allows the free ends 29*a*, 29*b* of the split inner smoke ring 28 to move away from each other to open and to move toward each other to close. This opening and closing also allows the free ends 33*a*, 33*b* of the split outer smoke ring 32 to move away from each other to open and to move toward each other to close.

The cage feet 18 on adjacent sides of fold line 49*a* forming the hinge are shaped so they do not hit each other when the cage 14 and support plate portions 10*a*, 10*b* rotate about that hinge line 49*a*. Thus, as seen in FIG. 6B, cage feet 18*a*, 18*b* on opposing sides of fold line 49 which forms the hinge 49*a* for the cage 14 to open and close, have a triangular shape formed by an inclined edge 58*a*, 58*b* on the respective cage feet 18*a*, 18*b*. The inclined edges 58*a*, 58*b* are angled away from each other as the radial distance from the assembly longitudinal axis 16 increases and as the distance from the sidewall 20 increases. Thus, as the cage 14 rotates about the hinge line 49*a* the angled edges 58*a*, 58*b* approach each other and may be configured to abut each other to limit the amount of rotation of the first and second sidewall portions 20*a*, 20*b* of the sidewall 20 of the cage 14. The cage feet 18 can be shaped to prevent interference with each other when the cage 14 is opened.

Scoring, rolling or stamping the sidewall 20 to form the fold lines 49 and hinge line 49*a* can provide a cost-effective way to produce and assemble the cage 14. This manufacturing and assembly technique has the disadvantage that repeated flexing of the fold line acting as hinge line 49*a* will lead to fatigue fracture of the hinge line 49*a*, especially when the sidewall 20 is made of metal. The material used to make the sidewall 20 and the method used to make the fold lines 49 are selected to produce a fold line 49*a* that allows the fire stop portions to be opened a distance sufficient to encircle the expected tube 30 and then closed, at least five times and may be ten times before there is any separation of the sidewall 20 along the hinge 49*a* and the hinge line 49*a* may at least partially breaks and at least partially physically separates between 3 and 20 opening and closing cycles. One opening and closing cycle moves the sidewall segments 50, 52 from the closed position to an open position where the sidewall segments 50, 52 are separated a distance corresponding to the maximum tube diameter for which the assembly is advertised for use—plus one inch.

Figure 3A:
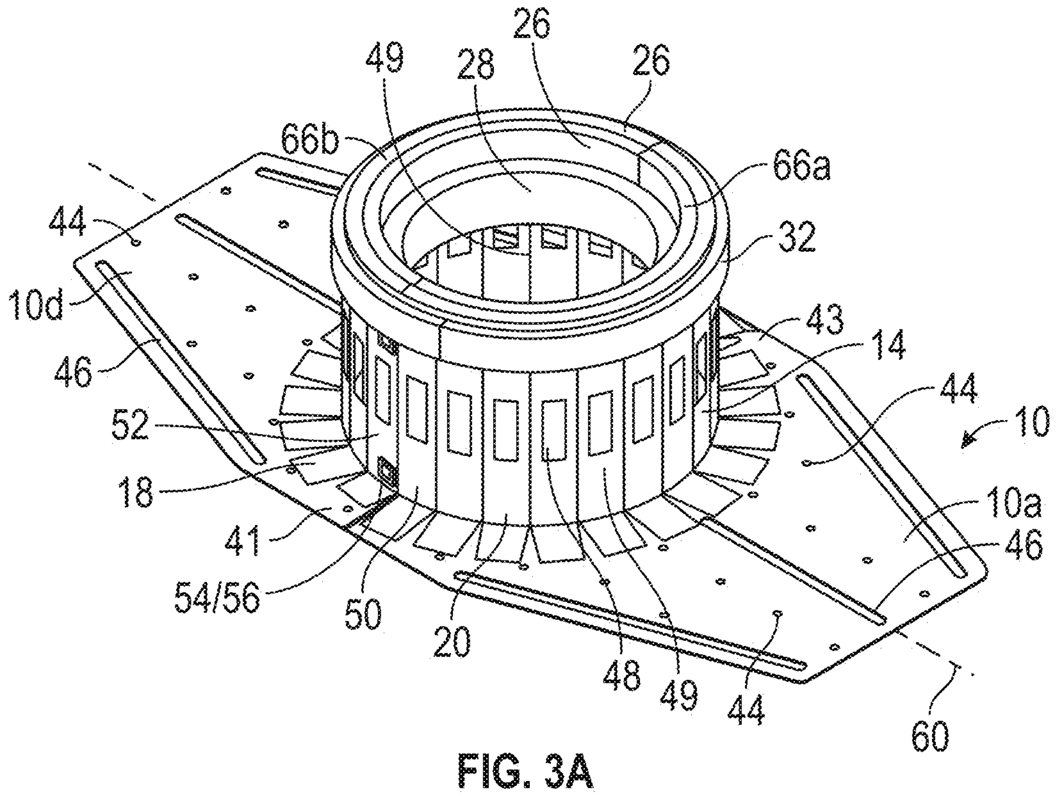
FIG. 3A is a top perspective view of the exploded fire stop assembly of FIG. 2 in an assembled configuration.

The fold line 49*a* is opposite the juncture of end segments 50, 52. The cage foot 18*c* on end segment 52 can be shorter in the lateral or radial direction than the cage feet 18 on the other segments. As seen in FIG. 3A, a series of fastener holes 44 are located on a circle about longitudinal passage axis 16, just laterally outside the distal ends of the cage feet 18.

Figure 3B:
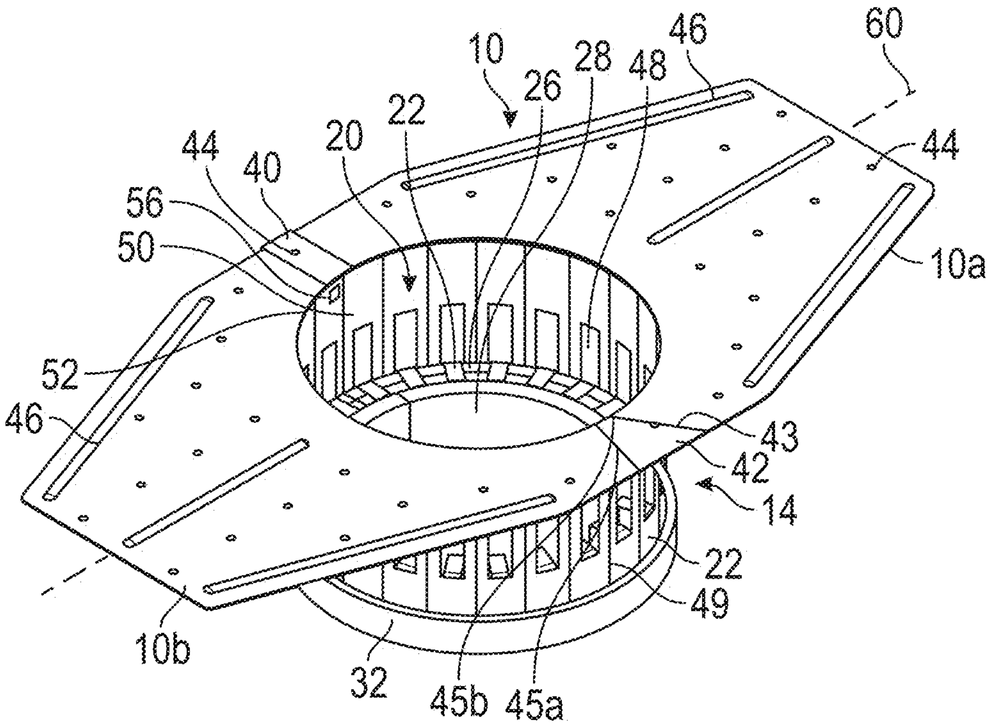
FIG. 3B is a bottom perspective view of the fire stop assembly of FIG. 3A.

Referring to FIGS. 1-3, the cage arms 22 extend inward with distal ends 24 extending upward and thus form a ring of cage arms around the upper periphery of the sidewall 20 encircling the assembly longitudinal axis 16. The intumescent ring 26 rests on the cage arms 22, between the distal ends 24 of those cage arms and the inward facing side of the sidewall 20. The intumescent ring 26 is shown as formed of two concentric rings of material, each formed of a single, elongated strip of intumescent material that is curved into a circle to form an inner and outer ring. The number of concentric intumescent rings will vary with the application from a single intumescent ring, to several, depending on the amount of expansion in the lateral plane that is desired. From one to three intumescent rings, each about 0.2 to 0.3 inches thick, are believed sufficient for pipes eight inches in diameter or smaller, and more than five rings is unusual for pipes from 8-16 inches in diameter.

The cage arms 22 are sized to have a radial length slightly larger than the radial thickness of the intumescent ring 26 so the intumescent ring of material can be inserted into the distal ends 24 of the cage arms and moved axially to rest against the outwardly extending portion of the cage arms 22. The distal ends 24 are sized to extend upward along a sufficient axial length of the inward face of the intumescent ring 26 to keep the intumescent ring 26 from falling off the cage arms 22 and to center the intumescent ring 26 within the cage arms 22 and the cage 14 so it is coaxial with the assembly longitudinal axis 16. The distal ends 24 of the cage arms 22 may be parallel to the assembly longitudinal axis 16 and the sidewall 20 when installed in the concrete structure 36. The distal ends 24 may be inclined slightly (1-3 degrees) toward the axis 16 to make it easier to insert the intumescent material into the cage arms 22, but if inclined too greatly then a distal end of one or more of the cage arms could catch on a tube passing through the circle formed by the cage arms and impede the passage of the tube.

The smoke rings 28, 32 are advantageously made of closed cell, thermoplastic urethane (TPU) or other suitable material. The TPU material is compressible and compresses flat into or against any encircled plastic pipe when the intumescent ring 26 expands during a fire. The smoke rings are connected to one of an inside or outside wall of parts that may be cylindrical and concentric, with the smoke rings also contacting an adjacent concentric part to provide a barrier to smoke moving along the assembly longitudinal axis 16. The smoke rings 28, 32 are compressible to ensure they extend between walls of the parts between which they are inserted during assembly and installation, and by making them slightly larger than the expected gap between parts, the compressibility of the smoke rings 28, 32 allows for size differences and misalignments and also helps ensure the space between the parts is blocked by the smoke rings 28, 32. A flat, flexible washer also could be used as smoke ring 28, such as a silicon washer which bends along longitudinal axis 16 or otherwise deforms to accommodate dimensional differences, while also providing a barrier to smoke between the parts on the inner and outer diameter of the smoke rings 28, 32.

The intumescent ring 26 may be of any suitable intumescent material which expands when exposed to the high temperatures that occur during fires. The axial height of the intumescent ring 26 may vary according to the diameter of opening through which various pipes or other conduits may pass, and may vary according to the strength of the seal formed when the intumescent material expands. The first and second sidewall portions 20*a*, 20*a* have respective first and second sidewall distal ends 64*a*, 64*b*. The height or axial length of the intumescent ring 26 along assembly longitudinal axis 16 may be greater than the axial distance from the cage arms 22 to the first and second sidewall distal ends 64*a*, 64*b* of the sidewall 20. The cage arms 22 may be located relative to the support plate 10 so that first and second sidewall distal ends 64*a*, 64*b* of the sidewall 20 is located in the passage 34 through the concrete structure 36 and above the cage 14 and the highest portion of the corrugated bottom plate 38, with the first and second intumescent distal ends 66*a*, 66*b* of the intumescent ring 26 extending further into the passage 34. The first and second intumescent distal ends 66*a*, 66*b* facing away and furthest from the support plate 10.

The cage arms 22 on the sidewall 20 are offset axially from the support plate 10 a distance sufficient to place at least a portion, such as a majority of the intumescent ring 26, inside the portion of the passage 34 through the concrete that is above the height H of the corrugations of the bottom plate 38 and into the portion of the concrete structure 36 having thickness T2 (FIG. AC). At that location, the intumescent ring 26 is completely encircled in the lateral direction by concrete, with the passage 34 forming a cylindrical hole with curved sidewalls surrounding the intumescent ring 26. In the portion of the passage 34 located in thickness T2, the sidewall 20 of the passage 34 may be a uniform distance from the axis 16 and intumescent ring 6 when the passage is cylindrical. Between the concrete thicknesses T1 and T2, the lateral shape of the passage 34 will vary and depends on how the passage intersects the corrugations on the corrugated bottom plate 38 because the passage 34 may extend over more than one corrugation or part of a corrugation. Between the concrete thicknesses T1 and T2, the lateral expansion of the intumescent material 26 during a fire may contact part of the concrete structure 36 but the contacted portion will probably not completely encircle the axis 16 and thus would not necessarily seal the passage 34 through the concrete.

Thus, the intumescent ring 26 may be located so that for a corrugated bottom plate 38 having the height H (FIG. 4C), a sufficient portion of the intumescent ring 26 is located a distance greater than H from the facing portion of the support plate 10, so that during a fire the ring 26 may expand and form a suitable gas and fluid seal within the passage 34 and/or within the cage 14. A majority of the length or height of the intumescent ring 26 along axis 16 is located within the thickness T2 of the concrete structure 36 and located a distance greater than H from the facing portion of the support plate 10. In additional or alternative constructions, all of this length or height of the intumescent ring 26 may be so located.

Figure 4A:
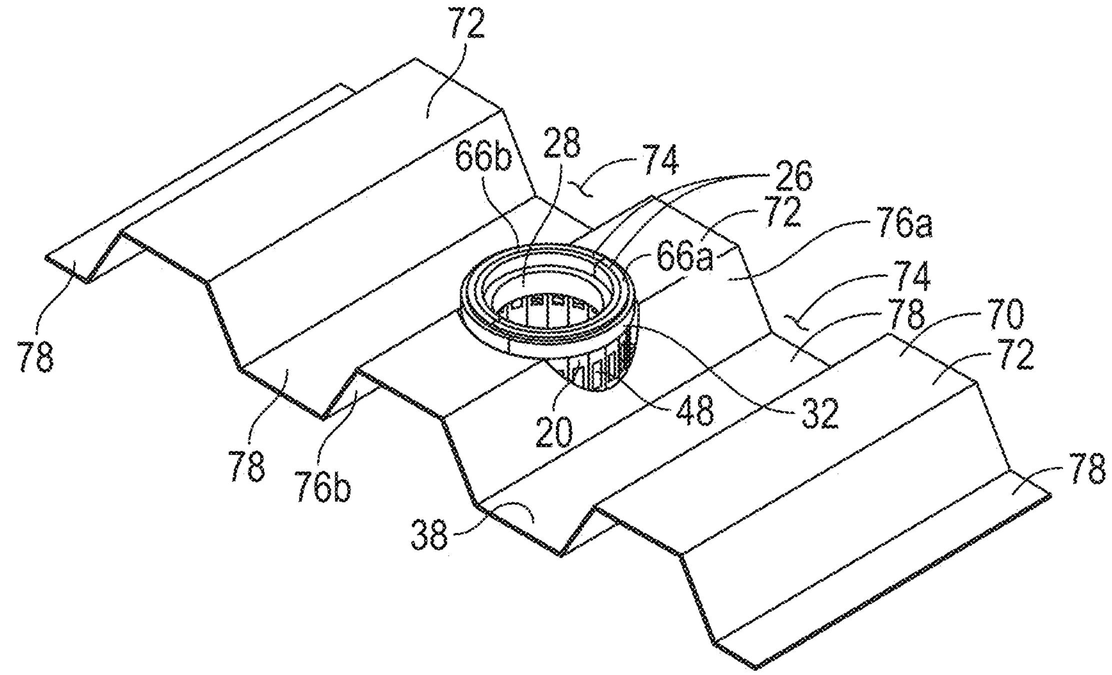
FIG. 4A is a top perspective view of the fire stop assembly of FIG. 3A extending through a hole in a corrugated bottom plate.
Figure 4B:
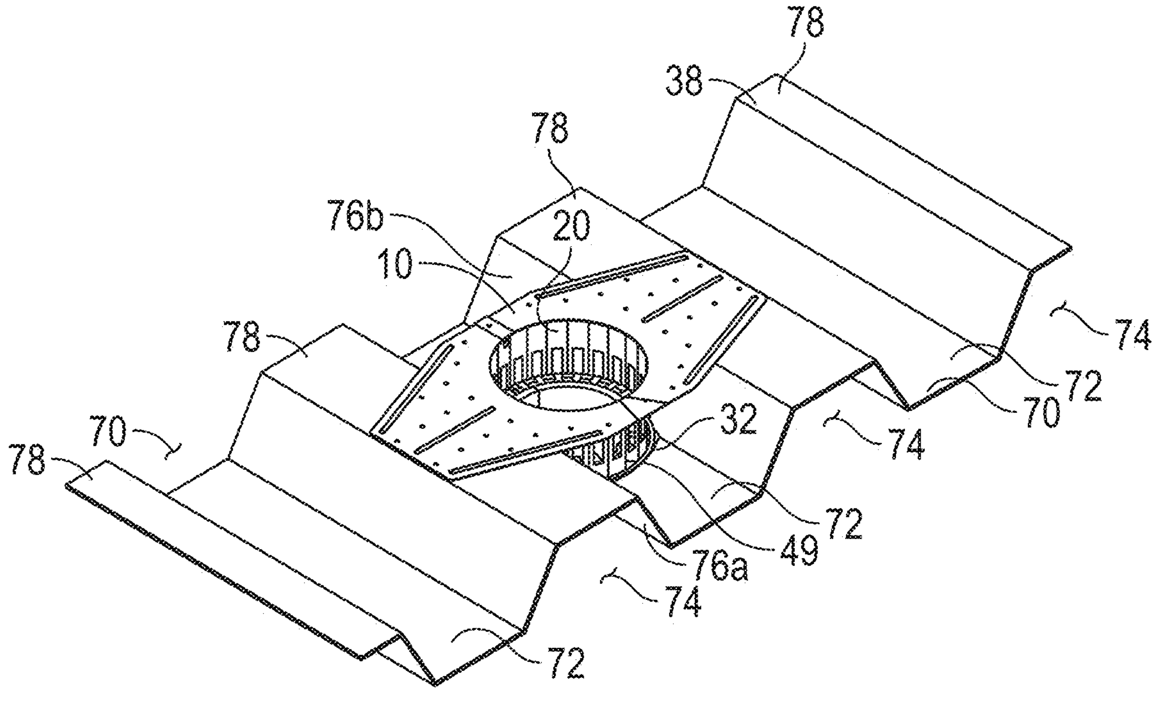
FIG. 4B is a bottom perspective view of the fire stop assembly of FIG. 4A showing the fire stop assembly of FIG. 3B extending through a hole in the corrugated bottom plate.
Figure 4C:
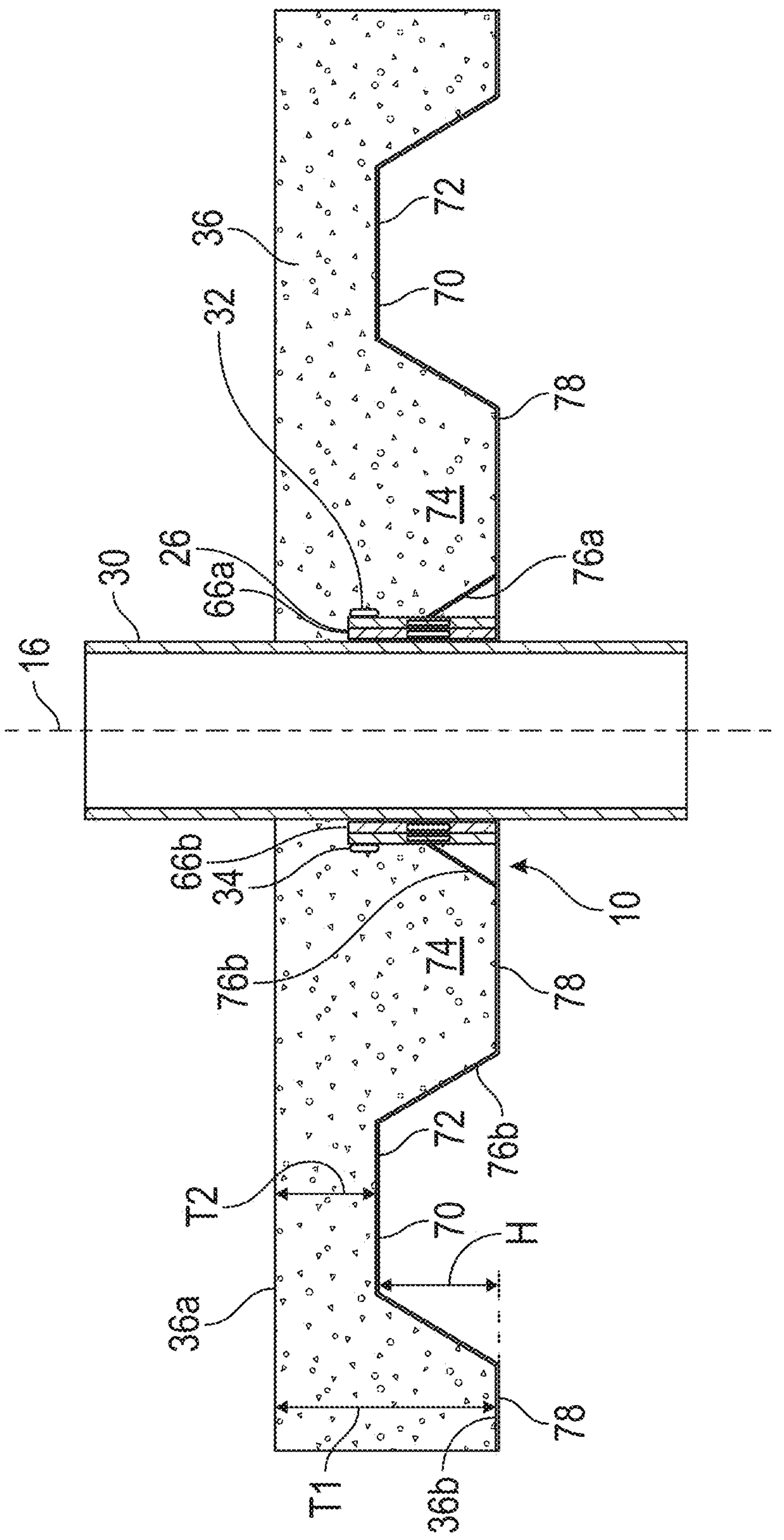
FIG. 4C is a cross-sectional view of the fire stop assembly of FIG. 3A inserted into the bottom of a passage through a concrete floor with a corrugated bottom.
Figure 4D:
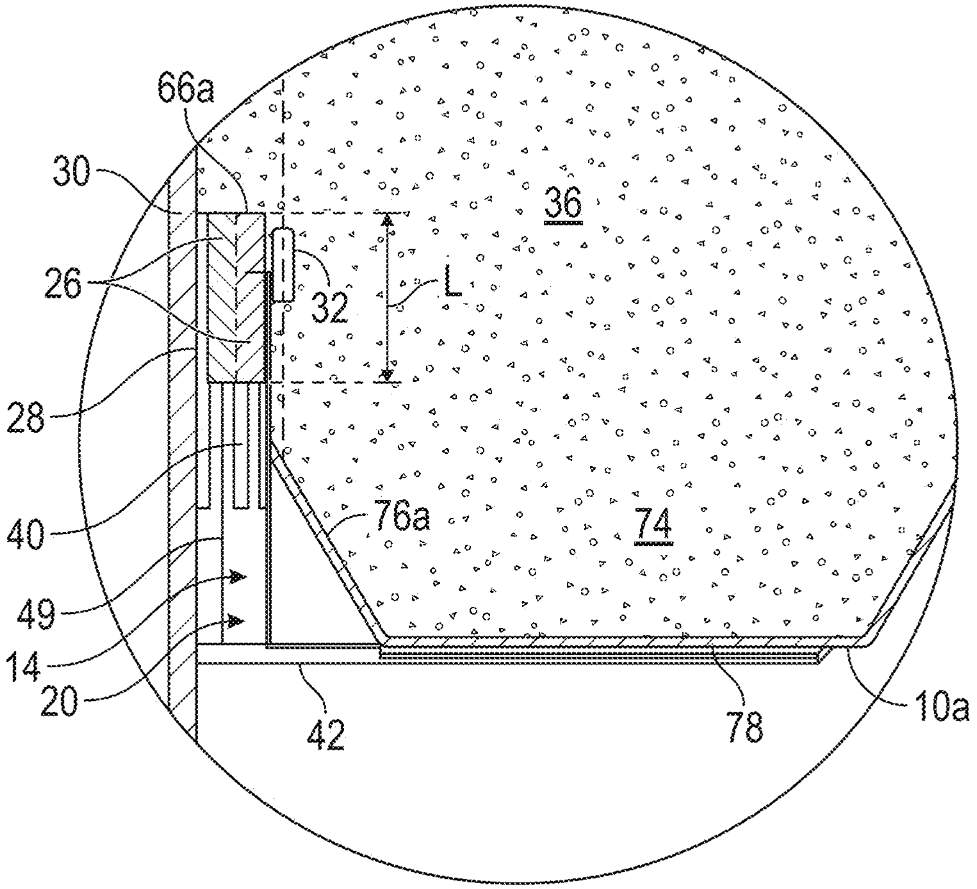
FIG. 4D is an enlarged portion of FIG. 4C showing one side of the fire stop assembly inserted into the bottom of a passage through a concrete floor with a corrugated bottom.

As seen in FIGS. 4A, 4C, and 4D, the first and second intumescent distal ends 66*a*, 66*b*, of the intumescent ring 26 extends beyond the first and second sidewall distal ends 64*a*, 64*b* of the sidewall 20 so that when the intumescent ring 26 expands during a fire, the part extending beyond the top of the sidewall can expand inward and outward and along axis 16. The extension beyond the first and second sidewall distal ends 64*a*, 64*b* of the sidewall 20 can be optional as the intumescent ring 26 may expand both along the axis 16 beyond the first and second sidewall distal ends 64*a*, 64*b* of the sidewall 20, and expand outward as described. The portion of the intumescent ring 26 within the sidewall 20 is constrained by the sidewall 20 to expand inward and seal against the tube 30 (which can take the form of various wires, tubes, conduits, pipes or other elongated members) passing through the passage 34 through the concrete. Thus, at least the top of the intumescent ring 26 may be far enough from the support plate 10 so that it extends into the passage 34 through the concrete and into the thickness portion T2, and extends beyond the top of the sidewall 20 a distance sufficient that it can form a fluid and gas seal with the passage 34 through the concrete during a fire. A cage 14 having about one-half to one quarter of the axial length of the intumescent ring 26 measured along axis 16 located inside the cage 14, and about one half to one quarter of the axial length of the intumescent ring 26 extending beyond the first and second sidewall distal ends 64*a*, 64*b* of the sidewall 20, is believed suitable.

A cage 14 having an outer diameter of about 4 to about 5 inches, and an intumescent ring 26 having about one to about 1.5 inches of axial length within the cage 14, and about 0.5 to 1.5 inches of axial length extending beyond the first and second sidewall distal ends 64*a*, 64*b* of the sidewall 20 of the cage 14, is believed suitable for passages 34 about 4 to about 6 inches diameter. The intumescent ring 26 extending about 0.5 to about 3 inches above the first and second sidewall distal ends 64*a*, 64*b* of the sidewall 20 is believed suitable for such diameters. It is believed suitable to have an intumescent ring 26 having a lower end connected to and held by cage arms 22 and distal ends 24, and in which the intumescent ring 26 has a length L measured along the assembly longitudinal axis 16, and where the intumescent ring 26 may extend beyond the sidewalls 20 a first distance between 0.2L and L, such as a first distance between 0.2L and 2L.

In some embodiments, the diameter of the cage 14 may be about ⅛ an inch smaller than the diameter of the passage 34. For a corrugated bottom plate 38 with corrugations having height H (FIG. 4C) of about 3 inches, a cage 14 having a height of about 4.5 to about 5.5 inches above support plate 10, is believed suitable, with the cage arms 22 and the bottom of the intumescent ring 26 located about 3 inches from the facing surface of the support plate 10.

Referring to FIGS. 4A-4D, the relative dimensions of the thickness of the concrete and the height of the corrugations will vary, with the corrugations often being about 2 inches to about 3 inches high or deep measured along axis 16, with the height depending being measured when the fire stop assembly is viewed from the bottom of the concrete structure 36, with FIG. 4B showing a bottom of the fire stop assembly fastened to a corrugated bottom plate 38. The corrugations are usually wider than they are high or deep, and often about 3 inches to about 5 inches wide. The concrete structure 36 may have a maximum thickness T1 of about 4 to about 12 inches, with a minimum thickness T2 depending on the height of the corrugations along axis 16. The thickness of the corrugated bottom plate 38 is usually small compared to the thickness of the concrete structure 36 and is included in the concrete thickness for ease of description. The corrugated bottom plate 38 may have a thickness of about 0.1 to about 0.2 inches.

Referring to FIGS. 4A and 4C, when viewed from the top of the corrugated bottom plate 38 (as if standing on the corrugated bottom plate), the corrugated bottom plate 38 is a sheet formed with a plurality of upwardly extending ridges 70 separated by downwardly extending channels 74. The upwardly extending ridges 70 have a top 72 and the channels 74 have a bottom 78 connected through two sidewalls 76*a*, 76*b* to adjacent tops 72 on opposing sides of the bottom 78 and on opposing sides of the channel having the bottom 78. The ridges 70 and channels 74 are parallel, and as described, the channel sidewalls 76 could be viewed as forming part of the ridge 70. Note that when the corrugated bottom plate 38 is viewed from the bottom (such as the bottom perspective view of FIG. 4B) at which the fire stop assembly is inserted into the passageway 34, then the ridges 70 become depending ridges separated by upwardly extending channels 74. The described ridge tops 72 and channel bottoms 78 are typically of uniform width measured along an axis perpendicular to the length of the ridge tops 72 and channel bottoms 78, and of uniform corrugation height H (FIG. 4C) measured from a plane containing the channel bottoms 78. Sometimes stiffening ribs (not shown) will be formed along the length of the channel bottoms 78 and ridge tops 72.

The passage 34 is usually bored or drilled after the concrete structure 36 has hardened and the diameter of the passage may vary with the diameter of the drill or boring tool. The roughness and shape may also vary as construction workers do not always hold the drill at the same angle the entire time the hole is being drilled. As used herein, references to a "generally cylindrical" passage or hole include the variations that arise from forming the passage, and these usually include axial variations (e.g., tilt) of up to an inch. The "generally cylindrical" passages or holes also include variations on the desired circular cross-section such as oval or multi-lobed cross-sections that are usually within an inch of the desired circular section. The "generally cylindrical" passage also refers to a majority of the length of the hole at the center of the concrete structure 36 because the concrete may spall if no plate 38 supports the side of the concrete from which the drill bit exits when the hole is drilled, and it may chip and spall at the surface where the drill enters the concrete may chip and spall as the hole is drilled.

The assembly longitudinal axis 16 may be located to pass through the center of a channel 74. But depending on the location and diameter of the passage 34 and the dimensions and orientation of the ridges 70 and channels 74, the passage may extend across various combinations of ridges 70 and channels 74. FIGS. 4A-4B show the passage longitudinal axis 16 as centered on a ridge 70 and/or its ridge top 72, with the passage 34 extending part way into the channel bottom 78 of the channels on opposing sides of that ridge. FIG. 4C shows the passage 34 centered on the channel bottom 78 and extending part way into the two channel sidewalls 76*a*, 76*b* on opposing sides of that channel. Each of the support plate portions 10*a*, 10*b* extend across all or part of two ridge tops 72 and all or part of two channels 74. Each of the support plate portions 10*a*, 10*b* can be long enough to extend onto a ridge top 72 of an adjacent ridge 70 to provide a stable connection and support for the fire stop assembly and to maintain alignment of the cage 14 relative to the support plate 10 and the passage 34.

Furthermore, the length of the support plate 10 along support plate longitudinal axis 60 is sufficient to extend across 2, 3 or 4 consecutive ridge tops 72 when axis 60 is perpendicular to the ridges and channels on the support plate 38. The ridge tops 72, the channel sidewalls 76*a*, 76*b* and the channel bottoms 78 are shown in FIGS. 4A-4D as straight, with the sidewalls 76*a*, 76*b* inclined outward and upward to form the ridges 70 and the channels 74 having a trapezoidal cross-sectional shape. But the ridge tops 72, channel sidewalls 76*a*, 76*b* and channel bottom could be curved in a sinusoidal shape with repeating curved channel tops and channel bottoms equally spaced apart. Further, in FIGS. 4A-4D, the channel bottoms 78 may be wider than the ridge tops 72 measured along an axis perpendicular to the length of the ridges 70 and the channels 74 (and perpendicular to the ridge tops 72, the channel sidewalls 76*a*, 76*b* and the channel bottoms 78). In FIG. 4C, the channel bottoms 78 have the same width as the ridge tops 72, measured along an axis perpendicular to the length of the ridges 70 and the channels 74. The width of the channels 70 and ridge tops 72 may thus vary, as may the inclination of the sidewalls 76*a*, 76*b*.

As seen in FIGS. 4A-4D, the support plate portions 10*a*, 10*b* each has two opposing straight sides inclined toward a distal end of the respective support plate portions 10*a*, 10*b* and toward the plate longitudinal axis 60, with a straight end that is perpendicular to that support plate longitudinal axis 60. Fastener holes 44 extend along the straight end of each of the support plate portions 10*a*, 10*b* and the length of the support plate 10 is advantageously selected to locate these holes along the ends of the support plate portions 10*a*, 10*b* so they may extend over a portion of a flat ridge top 72 to allow an installation of fasteners to connect the support plate to the corrugated deck plate 38. Rows of periodically spaced holes 44 are provided in the support plate 10 along lines parallel to the support plate longitudinal axis 60.

The assembly process for the tire stop assembly is roughly as follows. The first and second support plate portions 10*a*, 10*b* of the support plate 10 are placed in the closed position and the feet 18 are spot welded or otherwise connected to the first and second support plate portions 10*a*, 10*b* so that the first sidewall portion 20*a* is fastened to first support plate portion 10*a*, and second sidewall portion 20*b* is fastened to second support plate portion 10*b*. The sidewalls 20 encircle the opening 12 in the support plate 10 and are positioned before fastening so the end segments 50, 52 are located by the offset plates 40 and 42. The intumescent ring 26 is inserted into the inside of the cage 14 so the bottom of the intumescent ring 26 rests on the bottom of the cage arms 22. Part of the intumescent ring 26 may extend beyond the distal (top) portion of the cage 14 (i.e., above the sidewall 20).

The intumescent ring 26 may be a split ring having at least one separation forming two separate but adjacent ends 27*a*, 27*b* that may directly contact each other during assembly, during installation, and during a fire. The intumescent ring 26 may be slit twice to form the two separable first and second intumescent ring portion 26*a*, 26*b* with respective the ends 27*a*, 27*c* on the first intumescent ring portion 26*a*, and ends 27*b*, 27*d* on the second intumescent ring portion 26*b*. Each opposing end of the first intumescent ring portion 26*a* is advantageously located to extend to the distal end of the first and second end segments. If the fire stop assembly were used only for passages with no preexisting tube 30, the intumescent ring could be a continuous ring with no slit and inserted into the cage arms 22 after the cage 14 was formed and latched together.

The basic fire stop assembly includes the support plate 10, the cage 14, and the intumescent ring 26. The smoke rings may be optional. For example, the inner smoke ring 28 is placed inside the intumescent ring 26 and has its outer portion held in position by various retention mechanisms, such adhesives, or impaling inner smoke ring 28 on the distal end 24 of one or more cage arms, or mechanical fasteners. A permanent connection may be used so that the inner smoke ring 28 is not dislodged if tube 30 (e.g., pipe or pipes, conduits, cables, wires, or other elongated members) is passed through the opening in the inner smoke ring 28. Adhesives also may be used. The inner smoke ring 28 may be annular in shape and has an inner diameter sized to abut against an inner opening (may be circular) configured to resiliently engage the outer portion or outer diameter of an expected tube 30 (e.g., pipe(s), wire bundle(s), conduit(s), or one or more other elongated members) passing through the passage 34. An inner opening smaller in size than the expected size of the tube 30 may be used so as to provide a resilient connection and a seal to prevent passage of smoke. An inner smoke ring 28 of about ⅜ inch thick, closed cell TPU is believed suitable for pipes about 4-6 inches in diameter.

The outer smoke ring 32 is placed around the outer surface of either the intumescent ring 26, or may be placed around the distal (upper) end of the cage 14 and its sidewall 20. The outer smoke ring 28 may be fastened to the intumescent ring 26 but may be fastened to the cage 14 using adhesives, mechanical fasteners, an interference fit, etc. . . . A permanent connection may be used, and adhesives may be used as well. An outer smoke ring 32 of about 3⁄16 inch thick, closed cell TPU can be used for pipes about 4 inches to about 6 inches in diameter. The outer diameter of outer smoke ring 32 is selected to form an interference fit with the expected diameter or shape of passage 34. The order in which the intumescent ring 28, inner smoke ring 28 and outer smoke ring 32 are installed can vary. The cage 14 and the support plate portions 10*a*, 10*b* may be open or closed for all or portions of the formation process.

The fire stop assembly may be configured to fit a range of different diameters of tube 30, with the tube diameters typically differing by one quarter to one inch in diameter for passages from about 2 to about 8 inches in diameter, with larger ranges as the pipe diameter increases. Thus, for example, a cage 14 can have a diameter of about 4.75 inches and could have an inner smoke ring 28 with an inner diameter configured to resiliently engage a tube 30 having a diameter of about 4.0 inches to about 4.5 inches, with an outer smoke ring 32 configured to resiliently engage a passage 34 having a diameter of about 5 inches, and with the intumescent ring 26 configured to block the passage 34 during a fire by expanding both inward and outward relative to the longitudinal axis 16.

While having the intumescent ring 26 extend beyond the upper end of the sidewall 20 helps ensure that part of the intumescent ring is not restrained from outward expansion by the sidewall and thus may more readily expand outward to seal against the passage 34, the un-expanded intumescent ring need not extend beyond the end of the sidewall to seal against the passage 34. By selecting the material of the intumescent ring 26 to be suitably expandable and by providing an intumescent ring with a sufficient length along axis 16 and a sufficiently radially thickness the intumescent ring may be located inside the sidewall 20 and at or slightly below the top end of that sidewall and still expand under heat so that the intumescent material expands beyond the top end of the sidewall and expands outward to seal against the passage 34. Having a portion of the intumescent ring 26 extend beyond the top of the sidewall 20 makes it easier to damage the intumescent ring during handling and installation, while the sidewall 20 protect the intumescent ring against such damage. But having the intumescent ring 26 extend beyond the sidewall 20 provides additional assurance the passage 34 will be sealed. Thus, it is believed optional to have the intumescent ring 26 extend beyond the top end of the sidewall 20.

The installation and use of the fire stop assembly are described using a floor, recognizing the orientation will be changed if the fire stop assembly is inserted into a hole through a vertical wall or other inclined concrete structure. The fire stop assembly is installed after the concrete is poured on a corrugated bottom plate 38, finished and hardened to form the concrete structure 36. A hole is drilled or bored through the concrete and metal corrugated bottom plate 38 to form the passageway 34 through the concrete. Circular holes resulting in cylindrical passages are the predominant shape of the resulting drilled or bored passage 34. The tube 30 (which includes pipes, conduits, wires or other elongated members) may be placed through the passage 34 before or after installation of the fire stop assembly.

If the tube 30 does not already extend through the passage 34 then once the assembly of the support plate 10, the cage 14 and the intumescent ring 26 is formed, the cage 14 and its sidewall portions 20*a*, 20*b* are latched together in the closed position. The cage-end of the latched-close assembly is inserted into the passage 34 from the bottom up and the support 10 is fastened to the concrete structure 36. The fire stop assembly may be inserted with at least one of the inner and outer smoke rings in place, but those may be omitted. The fire stop assembly thus may be inserted so that the outer smoke ring 32 and the intumescent ring 26 and the sidewall 20 pass through the opening formed in the corrugated bottom plate 38 and into the passage 34, until the support plate 10 hits the corrugated bottom plate 38. The fire stop assembly may be rotated about the assembly longitudinal axis 16 to achieve the connection to the corrugations.

The fire stop assembly may be rotated to align the support plate 10 so plate longitudinal axis 60 extends perpendicular to the length of the corrugation ridges 70 and channels 74. If The support plate 10 can be fastened to the corrugated bottom plate 38 by welding, adhesives, concrete nails, screws, or other fasteners or connection mechanisms passing through the support plate (such as at the location of the fastener holes 44). The support plate 10 can be sized so that the plate longitudinal axis 60 is oriented to extend across at least two corrugations, one on each opposing side of the tube 30 and passage 34, with the plate longitudinal axis 60 which may be perpendicular to the length of the corrugations. Thus, the first support plate portion 10*a* is fastened to one corrugation and the second support plate portion 10*b* is fastened to a different corrugation, with each fastening location on opposing sides of the tube 30 and the passage 34. The support plate 10 has an end-to-end length along plate axis 60 sufficient to extend across at least three corrugations (rim-to-rim distance) and has a length sufficient to extend across from three to six corrugations. Thus, for example, for corrugations having a spacing of about 2 inches (center to center) the two support plate portions 10*a*, 10*b* have a combined length of about 6 inches, and may be about an inch longer on each end. In some embodiments, the total length of the support plate 10 along plate axis 60 is about 3 to about 4 times the outer diameter of tube 30. For larger diameter tubes 30 (e.g., about 6 to about 10 inches) a total length of the support plate 10 along the support plate longitudinal axis 60 of about 6 to about 8 times the outer diameter of tube 30 can be employed. This elongated support plate 10 is in contrast to the existing assemblies which use circular support plates.

The fire stop assembly also can be used to retrofit a preexisting passage 34 through a concrete structure 36, which has a preexisting tube 30 (e.g., one or more pipes, wires, conduits or other elongated members) already extending through the passage 34. If the tube 30 already extends through the passage 34 then the assembly is spread apart to the open position, passed laterally across a portion of the tube 30 and then closed to encircle the tube, after which the closed assembly is slid along the tube 30 to insert the cage 14 into the passage until the support plate can be fastened to the corrugated bottom plate 38. The fire stop assembly is spread apart to the open position by rotating the first support plate portion 10*a*, the first sidewall portion 20*a*, the first intumescent ring portion 26*a*, the first portion 28*a*, the first portion 32*a* together, and relative to the second support plate portion 10*b*, the second sidewall portion 20*b*, the second intumescent ring portion 26*b*, the second portion 28*b* and the second portion 32*b*. The two assembly portions rotate like a clam-shell device about the living hinge in the cage 14 to open and close.

After the axis of the tube 30 is aligned with the assembly longitudinal axis 36, the two assembly portions are moved to the closed position. The first and second latch segments 54 and 56 on the sidewall 20 of cage 14 engage to hold the parts together. The various parts of the fire stop assembly may be connected as described above, except in this version it is useful to have the intumescent ring 26, the inner smoke ring 28 and the outer smoke ring 32 advantageously have at least one split line along which the adjacent ends of the intumescent ring 26, the inner smoke ring 28 and the outer smoke ring 32 can move apart to open in a clam-shell manner along with the cage 14, and close with the cage 14. These rings 26, 28, 32 may be rings with a single split that allows the split ends (e.g., 27*a*, 27*b*) to move apart to an open position while a portion of the ring opposite the split ends further apart than a bent portion which remains connected. These rings 26, 28, 32 may also have two separate portions as described later with each portion having open positions with one pair of ends that move much farther apart in the open position than a second pair of ends on the opposing side of the rings that remain adjacent each other but may physically separate in the open position. When in the closed position, the fire stop assembly is moved along the tube 30 until the support plate 10 contacts the corrugated bottom plate 38, whereupon the plate is fastened to the concrete. Before fastening, the plate may be rotated to align the support plate portions 10*a*, 10*b* with the corrugated ridges 70 and the channels 74, or to any other desirable orientation.

Any slight gap or gaps in the adjacent ends of the intumescent ring 26, or the inner and outer smoke rings 28, 32 are believed small enough that they do not make the ability to block smoke during fires unacceptable. Also, because the clam-shell opening and closing motion makes the ends of the intumescent ring 26, the inner smoke ring 28 and the outer smoke ring 32 approach each other in a tangential or circumferential direction, there is believed to be little or no gap between the ends that are opened and closed.

In the two portion version of the fire stop assembly mentioned above, the intumescent ring, inner smoke ring and outer smoke ring are split twice to form two separate and separable parts that are separately connected to the respective assembly portions of the sidewall 20. The inner smoke ring 28 is placed inside the intumescent ring 26 with the ends 29*a*, 29*b*, 29*c*, 29*d* aligned with the diameter through the assembly longitudinal axis 16 and the hinge line or the connection between end segments 50, 52 on the circumferential ends of the sidewall portions 20*a*, 20*b*, respectively. The smoke ring portions 28*a*, 28*b* are connected to the respective intumescent ring portions 26*a*, 26*b* with the ends 29*a*, 29*b*, 29*c*, 29*d* aligned with the respective ends 26*a*, 26*b*, 26*c*, 26*d* of the intumescent ring 26 to form an annular encircling smoke ring in the closed position and an open, clam-shell position to encircle the tube 30 in the open position. The connection between the inner smoke ring 28 and the intumescent ring 26 is as described above, such as by adhesives or various retention mechanisms, including mechanical fasteners. The inner smoke ring 28 may be annular in shape when the cage 14 is in the closed position and has an inner diameter sized to abut against an outer diameter of an expected tube (e.g., pipe(s), wire or cable bundle(s), conduit(s), or one or more other elongated members) passing through the passage 34.

In the fire stop assembly using two portions on the various rings, the outer smoke ring 32 is placed outside the intumescent ring 26 or the sidewall 20, with the ends 33*a*, 33*b*, 33*c* and 33*d* aligned with the plane through the axis 16 and the hinge line or the connection between end segments 50, 52. The outer smoke ring portions 33 a, 33*b* are connected to the respective intumescent ring portions 26*a*, 26*b* or connected to the sidewall 20 with the ends of the outer smoke ring 33*a*, 33*b*, 33*c*, 33*d* aligned with the respective ends 27*a*, 27*b*, 27*c*, 27*d* of the intumescent ring 26 or aligned with the end segments 50, 52 and the diametrically opposite segments of the sidewall 20 to form an annular encircling outer smoke ring in the closed position and an open, clam-shell position to encircle the tube 30 in the open position. The connection between the outer smoke ring 32 and the intumescent ring 26 or the sidewall 20 is as described above, such as by adhesives or various permanent retention mechanisms such as impaling or mechanical fasteners. The outer smoke ring 32 may be annular in shape when the cage 14 is in the closed position and has an outer diameter sized to abut against an inner diameter or wall of the passage 34.

Once the support plate 10, the cage 14 and the rings 26, 28, 32 are in the closed position encircling the tube 30, the support plate 10 may have its first and second support plate portions 10*a*, 10*b* fastened together (such as releasably fastened together) by engaging latch segments 54, 56 on the cage 14 and then fastening the support plate is fastened to the corrugated bottom plate 38 as described above after sliding the fire stop assembly along the tube 30—to the extent needed to achieve the connection with corrugated bottom plate 38.

When the support plate 10 is fastened to the corrugated bottom plate 38, the bottom of the intumescent ring 26 is located above the height H of the corrugation ridges 70 so a majority, such as substantially all of the intumescent ring 26, is above the height H of the corrugations 70 and located within the thickness T2 of the concrete structure 36. Because most passages 34 through the concrete and the cages 14 are large enough in diameter to intersect or extend across at least one raised portion of a corrugation it is possible for smoke to pass through the cage 14 and into the raised portion of a corrugation unless and until the passage inside the cage 14 is sealed and the most efficient way to achieve that seal is to block flow through the passage 34 through the concrete structure 36.

During a fire, the heat and smoke pass upward, with the inner and outer smoke rings 28, 32 blocking passage of the smoke through the passage 34. The smoke rings 28, 32 are made of a fire-resistant material and may be made of an open cell intumescent material to allow compressibility, but lack the large expansion coefficient of the intumescent ring 26. As the heat and smoke rise, they are transmitted to the intumescent ring 26 by the support plate 10 and the cage 14, the arms 22 and the distal ends 24 which may be of metal (e.g., stainless steel or galvanized sheet metal). Heat and smoke also pass along the inside of the cage 14 between the tube 30 and the sidewall 20, and further pass through the rectangular openings 48 to the space between the outside of the cage 14 and the passage 34 so as to heat the intumescent ring 26 from the inside, the bottom and the outside. As the intumescent ring 26 is heated and expands, the cage 14 prevents the portion of the ring 26 inside the sidewall 20 from expanding outward so the expansion of the intumescent ring 26 is directed to expand inward and press against the tube 30, with the number of rings in the intumescent ring 26 being selected to compress the tube 30 and seal the entire passage formed by the tube 30. The portion of the intumescent ring 26 that extends above the sidewall 20 and the cage 14 expands both laterally inward and outward (and upward along assembly longitudinal axis 16), and provides a seal against the passage 34 to prevent smoke and fire from passing upward through the annular gap between the cage 14 and the passage 34. Advantageously, the first and second intumescent distal ends 66*a*, 66*b* of the intumescent ring 26 located above the first and second sidewall distal ends 64*a*, 64*b* and the sidewall 20 is sized to block the entire opening of the passage 34 during a fire, and as the cage 14 restricts expansion toward the support plate 10, the top portion of the intumescent ring 26 expands upward along passageway longitudinal axis 16, away from the support plate 10 and that upward expansion helps ensure the intumescent ring 26 expands into the T2 portion of the passage 34 so as to block the passage 34 and not extrude out any openings formed by the corrugations of the corrugated bottom plate 38.

To the extent that the inner and outer smoke rings 28, 32 are fastened to the intumescent ring 26, the expansion of the intumescent ring 26 forces those smoke rings 28, 32 against the surfaces sealed by the respective smoke rings 28, 32 to make form a stronger barrier against the passage of smoke etc. than provided by the respective smoke rings 28, 32. The smoke rings 28, 32 thus provide initial barriers to the passage of smoke and heat through the passage 34 at lower temperatures, with the intumescent ring 26 providing a stronger barrier but at the higher temperatures needed to expand the intumescent ring 26. While these inner and outer smoke rings 28, 32 may be directly connected to the intumescent ring, 26 they could be connected directly to the cage 14 or other portions of the fire stop assembly.

There thus is provided a fire stop assembly that may be installed in a passage 34 before any tube 30 is placed through the passage 34, and that may also be retrofitted to passages 34 where a tube 30 already extends through the passage 34. There also is provided an apparatus that restricts the passage of smoke through the passage 34 during the start of a fire, before the temperature increases sufficiently to expand the intumescent material of the intumescent ring 26. Further, by blocking passage of smoke past the inner and outer smoke rings 28, 32, those smoke rings 28, 32 cause the temperature to increase at the location of the intumescent ring 26 and accelerate the expansion of that intumescent ring 26. The location of the first and second intumescent distal ends 66*a*, 66*b* of the intumescent ring 26 is above the top of the first and second sidewall distal ends 64*a*, 64*b* of the cage 14 also allows lateral and axial expansion of the intumescent ring 26 to provide and ensure a complete seal of the passage 34.

According to another embodiment, there is provided a method of installing a fire stop assembly about the tube 30 in the cylindrical passage 34. The method includes the step of providing a fire stop assembly. The fire stop assembly may be as described above. The method further includes the step of positioning the fire stop assembly around the tube 30 by translating the fire stop assembly orthogonal to the assembly longitudinal axis 16 with the first and second support plate portions 10*a*, 10*b* in the open position. The method further includes the step of closing the fire stop assembly around the tube 30 by rotating the first and second support plate portions 10*a*, 10*b* into the closed position with the tube 30 extending through the circular support plate opening 12. The method further includes the step of translating the fire stop assembly parallel the assembly longitudinal axis 16 along the tube 30 into the passage 34.

According to various embodiments, the step of closing of the fire stop assembly may include rotating the first and second sidewall portions 20*a*, 20*b* into the closed position to encircle the tube 30, and rotating the first and second intumescent ring portions 26*a*, 26*b* into the closed position to encircle the tube 30. The step of translating the fire stop assembly may include positioning the support plate 10 against the first side 36*b* of the concrete structure 36. The corrugated bottom plate 38 has a corrugation height H measured along the assembly longitudinal axis 16 and extending toward the second side 36*a* of the concrete structure 36. The step of translating the fire stop assembly may include extending the first and second intumescent distal ends 66*a*, 66*b* at least a distance equal to H or greater into the concrete structure 36.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination of features shown and described herein.

The invention claimed is:

1. A fire stop assembly for a cylindrical passage extending through a hardened concrete structure having a corrugated bottom plate along a first side of the concrete structure and a hardened concrete surface on an opposing second side of the structure, the corrugated bottom plate having alternating ridges and channel, the fire stop assembly having an assembly longitudinal axis, the fire stop assembly comprising:

a support plate having first and second support plate portions that rotate about a rotational axis parallel to the assembly longitudinal axis between open and closed positions;

a cylindrical cage having first and second sidewall portions with each sidewall portion including fold lines to form a plurality of segments aligned with the assembly longitudinal axis during use, each one of the plurality of segments having a window defined therein, each sidewall portion being connected to the respective first and second support plate portions and rotating between the open and closed positions with the respective first and second support plate portions, the first and second sidewall portions cooperating when in the closed position to encircle the assembly longitudinal axis, the first and second sidewall portions each having corresponding first and second distal ends opposite the first and second support plate portions and extending along the assembly longitudinal axis, each one of the plurality of segments of the cylindrical cage including a cage arm that extends inward respectively from a top side of the windows of the plurality of segments toward the assembly longitudinal axis with distal ends of the plurality of cage arms being oriented upward along the assembly longitudinal axis, the first and second sidewall portions each having corresponding first and second proximal ends opposite the first and second distal ends, the first and second proximal ends of the first and second sidewall portions each including a plurality of cage feet separated by gaps such that the plurality of cage feet are between adjacent sides of the fold lines to align with the plurality of segments, wherein the plurality of cage feet are configured to attach to the support plate; and a split intumescent ring having first and second intumescent ring portions each connected to and located radially inward of the respective first and second sidewall portions and rotating between the open and closed positions with the respective sidewall portions, the first and second intumescent ring portions cooperating when in the closed position to encircle the assembly longitudinal axis, the first and second intumescent ring portions each having corresponding first and second intumescent distal ends that extend a first distance beyond first and second sidewall distal ends along the assembly longitudinal axis.

2. The fire stop assembly of claim 1, wherein the first and second intumescent ring portions each have a length L measured along the assembly longitudinal axis and the first distance is between 0.2L and 2L.

3. The fire stop assembly of claim 1, wherein the corrugated bottom plate has a corrugation height H measured along the assembly longitudinal axis and extending toward the second side of the concrete structure, the concrete structure having a thickness T measured between a corrugation ridge and the second side of the concrete structure, the first and second sidewall portions each have a height along the assembly longitudinal axis which height is H or greater and which height is also less than the combined distance of the thickness T and the height H.

4. The fire stop assembly of claim 1, wherein the corrugated bottom plate has a corrugation height H measured along the assembly longitudinal axis and extending toward the second side of the concrete structure, the concrete structure having a thickness T measured between a corrugation ridge and the second side of the concrete structure, the first distance is H or greater and which first distance is also less than the combined distance of the thickness T and the height H.

5. The fire stop assembly of claim 1, wherein the corrugated bottom plate has alternating ridges and channels, the support plate defines a support plate plane orthogonal to the assembly longitudinal axis, and the first and second support plate portions each have a length sufficient to extend from one ridge to an adjacent ridge.

6. The fire stop assembly of claim 1, wherein the corrugated bottom plate has alternating ridges and channels, the support plate defines a support plate plane orthogonal to the assembly longitudinal axis, and the first and second support plate portions each have a length sufficient to extend across two to four ridges located in the plane of the support plate.

7. The fire stop assembly of claim 1, wherein the first and second sidewall portions each have the cage arms extending radially inward toward the assembly longitudinal axis in the closed position, and the first and second intumescent ring portions are engaged with the cage arms.

8. The fire stop assembly of claim 1, further includes first and second inner smoke ring portions fastened to and within the respective first and second intumescent ring portions and extending inward toward the assembly longitudinal axis, the first and second inner smoke ring portions having respective first and second inner smoke ring free ends which are spaced apart from each other in the open position and adjacent to or contacting each other in the closed position.

9. The fire stop assembly of claim 1, further includes first and second outer smoke ring portions fastened to and about the respective first and second sidewall portions and having respective first and second outer smoke ring free ends which are spaced apart from each other in the open position and adjacent to or contacting each other in the closed position.

10. The fire stop assembly of claim 1, wherein the passage is sized to allow a tube to pass through the passage, the first and second sidewall free ends are separated from each other a distance sufficient to allow the tube to pass between the first and second sidewall free ends in the open position.

11. A fire stop assembly for a cylindrical passage extending through a hardened concrete structure with a corrugated bottom plate along a first side of the concrete structure and a hardened concrete surface on an opposing second side of the concrete structure, the corrugated bottom plate having alternating ridges and channel, the fire stop assembly having an assembly longitudinal axis, the corrugated bottom plate having a corrugation height H measured along the assembly longitudinal axis and extending toward the second side of the concrete structure, the concrete structure having a thickness T measured between a corrugation ridge and the second side of the concrete structure, the fire stop assembly comprising:

a support plate having first and second support plate portions that rotate about a rotational axis parallel to the assembly longitudinal axis between open and closed positions, the respective first and second support plate portions each having respective first and second free plate ends which free plate ends are adjacent each other in the closed position and apart from each other in the open position, the first and second support plate portions when in the closed position cooperating to define a circular support plate opening centered about the assembly longitudinal axis, the support plate defining a support plate plane orthogonal to the assembly longitudinal axis, the first and second support plate portions each having a length sufficient to extend from one ridge to an adjacent ridge;

a cylindrical cage having first and second sidewall portions with each sidewall portion including fold lines to form a plurality of segments aligned with the assembly longitudinal axis during use, each one of the plurality of segments having a window defined therein, each sidewall portion being connected to the respective first and second support plate portions and rotating between the open and closed positions with the respective first and second support plate portions, the first and second sidewall portions cooperating when in the closed position to encircle the assembly longitudinal axis, the first and second sidewall portions each having corresponding first and second distal ends opposite the first and second support plate portions and extending along the assembly longitudinal axis, each one of the plurality of segments of the cylindrical cage including a cage arm that extends inward respectively from a top side of the windows of the plurality of segments toward the assembly longitudinal axis with distal ends of the plurality of cage arms being oriented upward along the assembly longitudinal axis, the first and second sidewall portions each having corresponding first and second proximal ends opposite the first and second distal ends, the first and second proximal ends of the first and second sidewall portions each including a plurality of cage feet separated by gaps such that the plurality of cage feet are between adjacent sides of the fold lines to align with the plurality of segments, wherein the plurality of cage feet are configured to attach to the support plate, the first and second sidewall portions each have a height along the assembly longitudinal axis which height is the height H or greater and which height is also less than the combined distance of the thickness T and the height H; and a split intumescent ring having first and second intumescent ring portions each connected to and located radially inward of the respective first and second sidewall portions and rotating between the open and closed positions with the respective sidewall portions, the first and second intumescent ring portions each having respective first and second intumescent ring free ends are adjacent each other in the closed position and spaced apart from each other in the open position, the first and second intumescent ring portions cooperating when in the closed position to encircle the assembly longitudinal axis.

12. The first stop assembly of claim 11, wherein the first and second intumescent ring portions each have corresponding first and second intumescent distal ends that extend a first distance beyond the first and second sidewall distal ends along the assembly longitudinal axis.

13. The fire stop assembly of claim 11, wherein the first and second intumescent ring portions each have a length L measured along the assembly longitudinal axis and the first distance is between 0.2L and 2L.

14. The fire stop assembly of claim 11, wherein a first distance is H or greater and which distance is also less than the combined distance of the thickness T and the height H.

15. The fire stop assembly of claim 11, wherein the first and second support plate portions each have a length sufficient to extend across two to four ridges located in the plane of the support plate.

16. The fire stop assembly of claim 11, wherein the first and second sidewall portions each have the cage arms extending radially inward toward the assembly longitudinal axis in the closed position, the first and second intumescent ring portions are engaged with the cage arms.

17. The fire stop assembly of claim 11, further includes first and second inner smoke ring portions fastened to and within the respective first and second intumescent ring portions and extending inward toward the assembly longitudinal axis, the first and second inner smoke ring portions having respective first and second inner smoke ring free ends which are spaced apart from each other in the open position and adjacent to or contacting each other in the closed position.

18. The fire stop assembly of claim 11, further includes first and second outer smoke ring portions fastened to and about the respective first and second sidewall portions and having respective first and second outer smoke ring free ends which are spaced apart from each other in the open position and adjacent to or contacting each other in the closed position.

19. The fire stop assembly of claim 11, wherein the passage is sized to allow a tube to pass through the passage, and wherein the first and second sidewall free ends are separated from each other a distance sufficient to allow the tube to pass between the first and second sidewall free ends in the open position or the first and second intumescent ring free ends are separated from each other a distance sufficient to allow the tube to pass between the first and second intumescent ring free ends in the open position.

20. A method of installing a fire stop assembly about a tube in a cylindrical passage extending through a hardened concrete structure having a corrugated bottom plate along a first side of the concrete structure and a hardened concrete surface on an opposing second side of the structure, the fire stop assembly having an assembly longitudinal axis, the method comprising the steps of:

a) providing the fire stop assembly including:

a support plate having first and second support plate portions that rotate about a rotational axis parallel to the assembly longitudinal axis between open and closed positions, the respective first and second support plate portions each having respective first and second free plate ends which free plate ends are adjacent each other in the closed position and apart from each other in the open position, the first and second support plate portions when in the closed position cooperating to define a circular support plate opening centered about the assembly longitudinal axis;

a cylindrical cage having first and second sidewall portions with each sidewall portion connected to the respective first and second support plate portions and rotating between the open and closed positions with the respective first and second support plate portions, the first and second sidewall portions each having respective first and second sidewall free ends which sidewall free ends are adjacent each other in the closed position and spaced apart from each other in the open position, the first and second sidewall portions each having corresponding first and second distal ends opposite the first and second support plate portions and extending along the assembly longitudinal axis, each sidewall portion including fold lines to form a plurality of segments aligned with the assembly longitudinal axis during use, each one of the plurality of segments having a window defined therein, each one of the plurality of segments of the cylindrical cage including a cage arm that extends inward respectively from a top side of the windows of the plurality of segments toward the assembly longitudinal axis with distal ends of the plurality of cage arms being oriented upward along the assembly longitudinal axis, the first and second sidewall portions each having corresponding first and second proximal ends opposite the first and second distal ends, the first and second proximal ends of the first and second sidewall portions each including a plurality of cage feet separated by gaps such that the plurality of cage feet are between adjacent sides of the fold lines to align with the plurality of segments, wherein the plurality of cage feet are configured to attach to the support plate; and a split intumescent ring having first and second intumescent ring portions each connected to and located radially inward of the respective first and second sidewall portions and rotating between the open and closed positions with the respective sidewall portions, the first and second intumescent ring portions each having respective first and second intumescent ring free ends are adjacent each other in the closed position and spaced apart from each other in the open position, the first and second intumescent ring portions each having corresponding first and second intumescent distal ends that extend a first distance beyond the first and second sidewall distal ends along the assembly longitudinal axis;

b) positioning the fire stop assembly around the tube by translating the fire stop assembly orthogonal to the assembly longitudinal axis with the first and second support plate portions in the open position;

c) closing the fire stop assembly around the tube by rotating the first and second support plate portions into the closed position with the tube extending through the circular support plate opening; and d) translating the fire stop assembly parallel the assembly longitudinal axis along the tube into the passage.

* * * * *